US012763807B2

(12) United States Patent
Namgoong

(10) Patent No.: US 12,763,807 B2
(45) Date of Patent: Oct. 13, 2026

(54) SYSTEMS AND METHODS FOR SUPPRESSING CLOSE-IN PHASE NOISE AND RECIPROCAL MIXING NOISE IN SIGNALS

(71) Applicant: The Research Foundation for the State University of New York, Albany, NY (US)

(72) Inventor: Won Namgoong, Albany, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 202 days.

(21) Appl. No.: 18/290,125

(22) PCT Filed: May 11, 2022

(86) PCT No.: PCT/US2022/072262
§ 371 (c)(1),
(2) Date: Nov. 9, 2023

(87) PCT Pub. No.: WO2022/241443
PCT Pub. Date: Nov. 17, 2022

(65) Prior Publication Data

US 2024/0259039 A1 Aug. 1, 2024

Related U.S. Application Data

(60) Provisional application No. 63/286,617, filed on Dec. 7, 2021, provisional application No. 63/187,101, filed on May 11, 2021.

(51) Int. Cl.
*H04B 1/12* (2006.01)
*H04B 1/00* (2006.01)

(52) U.S. Cl.
CPC ........... *H04B 1/123* (2013.01); *H04B 1/0096* (2013.01)

(58) Field of Classification Search
CPC .... H04B 7/0617; H04B 1/123; H04B 1/0096; H04B 1/28
See application file for complete search history.

(56) References Cited

U.S. PATENT DOCUMENTS 7,675,999 B2 * 3/2010 Lawrence ................ H04B 1/28 375/326
2005/0239428 A1 * 10/2005 Seendripu ................ H04B 1/30 455/313

(Continued)

OTHER PUBLICATIONS

EP3343784A1, Pipon, Jul. 4, 2018, all (Year: 2018).*
JP2015100051A1, Takahashi, May 28, 2015 see fig 1 and corresponding description (Year: 2015).*

*Primary Examiner* — Curtis A Kuntz
(74) *Attorney, Agent, or Firm* — Garrett M. Smith

(57) ABSTRACT

A receiver includes a first mixer disposed in a first signal path, where the first mixer performs mixing of a radiofrequency signal with a first local oscillator signal to provide a first downconverted signal. The first local oscillator signal is produced using a signal generator, and the radiofrequency signal includes a desired signal. The receiver also includes a second mixer disposed in a second signal path, where the second mixer performs mixing of the radiofrequency signal with a second local oscillator signal to provide a second downconverted signal The second local oscillator signal is produced using the signal generator. The receiver is configured for performing processing of a first observed signal from the first signal path and a second observed signal from the second signal path to extract the desired signal.

44 Claims, 24 Drawing Sheets

(56) References Cited

U.S. PATENT DOCUMENTS

2017/0134155 A1* 5/2017 Chen .................... H04L 27/227
2019/0158135 A1* 5/2019 Ling ....................... H04B 1/30

* cited by examiner

SYSTEMS AND METHODS FOR SUPPRESSING CLOSE-IN PHASE NOISE AND RECIPROCAL MIXING NOISE IN SIGNALS

CROSS-REFERENCE TO RELATED APPLICATIONS

This application claims the benefit of priority of U.S. Provisional Application No. 63/187,101 filed May 11, 2021, titled "SYSTEMS AND METHODS FOR SUPPRESSING CLOSE-IN PHASE NOISE AND RECIPROCAL MIXING NOISE IN SIGNALS", which is incorporated by reference herein in its entirety. This application claims the benefit of priority of U.S. Provisional Application No. 63/286,617 filed Dec. 7, 2021, titled "SYSTEMS AND METHODS FOR SUPPRESSING CLOSE-IN PHASE NOISE AND RECIPROCAL MIXING NOISE IN SIGNALS", which is incorporated by reference herein in its entirety. This application claims the benefit of priority of International Patent Application No. PCT/US2022/072262 filed May 11, 2022, titled "SYSTEMS AND METHODS FOR SUPPRESSING CLOSE-IN PHASE NOISE AND RECIPROCAL MIXING NOISE IN SIGNALS", which is incorporated by reference herein in its entirety.

BACKGROUND OF THE INVENTION

The disclosure in one aspect relates generally to signal processing and particularly to noise suppression. The disclosure in one aspect relates generally to signal processing, and more particularly, to systems and methods for suppressing close-in phase noise and reciprocal mixing noise in signals.

Local oscillator phase noise is a major impairment that degrades the performance of communication receivers. There are two mechanisms by which the phase noise distorts the desired signal. In the first, the desired signal is distorted primarily by the phase noise spectrum near the carrier frequency. In the other, the outer skirts of the phase noise spectrum corrupt the desired signal via reciprocal mixing of interfering blockers.

BRIEF DESCRIPTION OF THE INVENTION

An aspect of the disclosure provides a receiver that comprises a first mixer disposed in a first signal path, wherein the first mixer performs mixing of a radiofrequency signal with a first local oscillator signal to provide a first downconverted signal, the first local oscillator signal produced using a signal generator, wherein the radiofrequency signal includes a desired signal; a second mixer disposed in a second signal path, wherein the second mixer performs mixing of the radiofrequency signal with a second local oscillator signal to provide a second downconverted signal, the second local oscillator signal produced using the signal generator; wherein receiver is configured for performing processing of a first observed signal from the first signal path and a second observed signal from the second signal path to extract the desired signal, wherein the first observed signal is produced in dependence on the mixing by the first mixer and wherein the second observed signal is produced in dependence on the mixing by the second mixer.

An aspect of the disclosure provides a method that comprises mixing a radiofrequency signal with a first local oscillator signal in a first signal path to provide a first downconverted signal, the first local oscillator signal produced using a signal generator, wherein the radiofrequency signal includes a desired signal;mixing the radiofrequency signal with a second local oscillator signal in a second signal path to provide a second downconverted signal, the second local oscillator signal produced using the signal generator; andperforming processing of a first observed signal from the first signal path and a second observed signal from the second signal path to extract the desired signal, wherein the first observed signal is produced in dependence on the mixing by the mixing of the radiofrequency signal with the first local oscillator signal and wherein the second observed signal is produced in dependence on the mixing of the radiofrequency signal with the second local oscillator signal.

An aspect of the disclosure provides a signal processing receiver system for suppressing close-in phase noise and suppressing reciprocal mixing noise. The signal processing receiver system including: a first receive path of a plurality of receive paths receiving an input signal, the first receive path including: a first radio-frequency (RF)-buffer structure buffering the received, input signal to form a first buffered input signal, a first radio frequency (RF)-to-intermediate frequency (IF) mixing structure operatively coupled to the first RF-buffer structure, the first RF-to-IF mixing structure: receiving the first buffered input signal, receiving a first local oscillating signal including: a first operating frequency, a first phase offset, and a first phase noise, and downconverting the first buffered input signal to generate a first intermediate frequency signal; and a first IF-buffer structure operatively coupled to the first RF-to-IF mixing structure, the first IF-buffer receiving the generated, first intermediate frequency signal from the first RF-to-IF mixing structure to form a first, buffered intermediate frequency signal; a second receive path of the plurality of receive paths, the second receive path distinct from the first receive path and including: a second RF-buffer structure buffering the received, input signal to form a second buffered input signal, a second RF-to-IF mixing structure operatively coupled to the second RF-buffer structure, the first RF-to-IF mixing structure: receiving the second buffered input signal, receiving a second local oscillating signal, distinct from the first local oscillating signal, the second local oscillating signal including: a second operating frequency, a second phase offset, and a second phase noise scaled linearly with respect to the first phase noise, and downconverting the second buffered input signal and to generate a second intermediate frequency signal; and a second IF-buffer structure operatively coupled to the second RF-to-IF mixing structure, the second IF-buffer receiving the generated, second intermediate frequency signal from the second RF-to-IF mixing structure to form a second, buffered intermediate frequency signal.

An aspect of the disclosure provides a method for suppressing close-in phase noise and suppressing reciprocal mixing noise. The method includes: receiving an input signal on a first receive path of a plurality of receive paths; buffering the received, input signal to form a first buffered input signal; receiving the first buffered input signal, receiving a first local oscillating signal including: a first operating frequency, a first phase offset, and a first phase noise, and downconverting the first buffered input signal to generate a first intermediate frequency signal; and receiving the generated, first intermediate frequency signal; forming a first, buffered intermediate frequency signal; receiving the input signal on a second receive path of a plurality of receive paths, the second receive path distinct from the first receive path; buffering the received, input signal to form a second buffered input signal; receiving the second buffered input signal, receiving a second local oscillating signal, distinct from the first local oscillating signal, the second local oscillating signal including: a second operating frequency, a second phase offset, and a second phase noise scaled linearly with respect to the first phase noise, and downconverting the second buffered input signal to generate a second intermediate frequency signal; and receiving the generated, second intermediate frequency signal; and forming a second, buffered intermediate frequency signal.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1A:
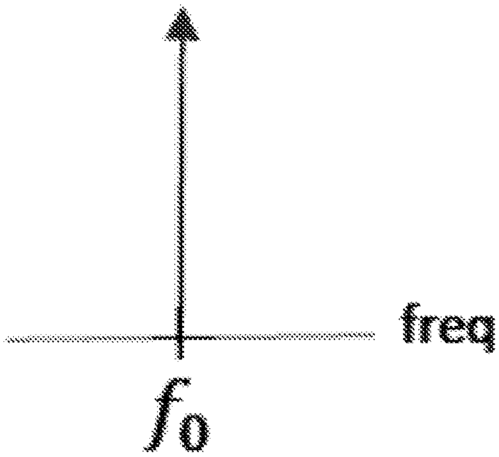
FIG. 1A shows a graph of an idealized frequency response of an oscillator, according to embodiments of the disclosure.

As an initial matter, in order to clearly describe the current disclosure it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As discussed herein, the disclosure relates generally to signal processing, and more particularly, to systems and methods for suppressing the signal distortion caused by close-in phase noise and reciprocal mixing noise. As discussed herein, the disclosure relates generally to signal processing, and more particularly, to systems and methods for suppressing close-in phase noise and reciprocal mixing noise in signals.

These and other embodiments are discussed below with reference to FIGS. 1-19. However, those skilled in the art will readily appreciate that the detailed description given herein with respect to these Figures is for explanatory purposes only and should not be construed as limiting.

1 Introduction

A problem of crucial importance to communication systems is the stability of oscillators. The oscillator instability due to noise, which manifests itself as phase noise, is one of the primary factors that limits the achievable performance in many modern and emerging communication systems. This is especially true in wideband receivers that must coexist with strong in-band blockers and in high data-rate systems that employ large constellation sizes. In addition to minimizing phase noise, the on-chip oscillators must be low power, frequency agile, and area efficient for both portability and cost reasons. Unfortunately, lowering the oscillator phase noise is fundamentally limited by the difficulty of realizing an on-chip high quality factor (Q) resonator. Furthermore, even if it were possible, a high-Q oscillator suffers from a narrow tuning range, which may not be suitable in many modern and emerging communication systems that require reconfigurability and flexibility.

In the wideband receivers envisioned in many modern and emerging wireless systems, no off-chip SAW filtering is performed to provide reconfigurability and to achieve higher levels of integration. As a result, the interfering blockers downconvert to the baseband largely unattenuated together with the desired signal. These blockers distort the received signal via gain desensitization and reciprocal mixing. Gain desensitization can be reduced by increasing the linearity of the receive chain, which has improved significantly in recent years by the use of current driven passive mixers and N-path filtering. Extensions of the current based receivers with N-path filtering have also been proposed to compensate for the effects of thermal noise, harmonic, and intermodulation distortions.

Although passive mixers with N-path filtering minimize gain desensitization by blockers, they are ineffective against the local oscillator (LO) phase noise reciprocal mixing, which occurs before the N-path filtering of the blockers. An approach to compensate for the effects of reciprocal mixing has been proposed in some examples, but its effectiveness is limited to operating conditions that are generally not realistic. Currently, the only way to reduce the effects of reciprocal mixing is to improve the oscillator phase noise itself, which, as noted earlier, is difficult because of the practical challenges of designing high-Q on-chip resonant tanks and the need for wide tuning ranges in wideband receivers. As a result, signal distortion from reciprocal mixing remains a major bottleneck that must be resolved before SAW-less wideband receiver becomes widely employed.

In addition to reciprocal mixing, the desired signal itself suffers from distortion even in the absence of interfering blockers due to the random phase rotation caused by the mixing with the noisy LO. Unlike in reciprocal mixing, however, this signal distortion, which is subsequently referred to as close-in phase noise distortion, has been well studied with many proposed compensation schemes. The close-in phase noise distortion becomes especially problematic in high data-rate systems that employ large constellation sizes and in multi-carrier systems such as the widely employed orthogonal frequency division multiplexing (OFDM), whose individual subcarrier bandwidth is comparable to the phase noise spectral bandwidth. The effect of phase noise on OFDM systems has been extensively analyzed and numerous data compensation schemes have been developed, most of which rely on the presence of interspersed pilot tones at the expense of reduced spectral efficiency.

Embodiments herein present a novel and practical approach to compensate for the effects of phase noise-both reciprocal mixing and close-in phase noise distortion. The general idea is to architect the receiver front-end with additional degrees of freedom so that the desired signal spans a different vector space than the subspace spanned by the distortion caused from reciprocal mixing and close-in phase noise. The phase noise induced distortion can then be removed by projecting to its null space to recover the desired signal. The presented approach is general and is effective regardless of the blocker spectrum and/or number of interferers. After passing through a front-end, the baseband samples can be simply weighted then summed at each time instant using weights that are computed a priori without knowledge of the interferer or the desired signal characteristics to seamlessly compensate for both reciprocal mixing and close-in phase noise distortion. As shown later in the preliminary results, the resulting performance improvement is significant. Furthermore, existing close-in phase noise compensation schemes can be applied subsequently to achieve additional performance improvement.

2 Background on Phase Noise

Figure 1B:
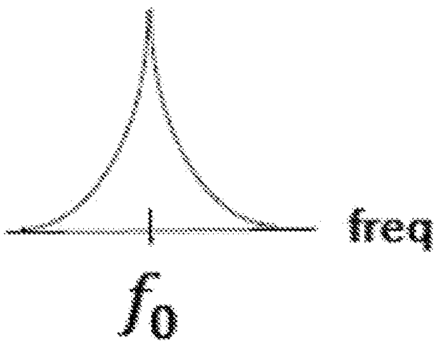
FIG. 1B shows a graph of an actual oscillator output spectrum, according to embodiments of the disclosure.
Figure 1C:
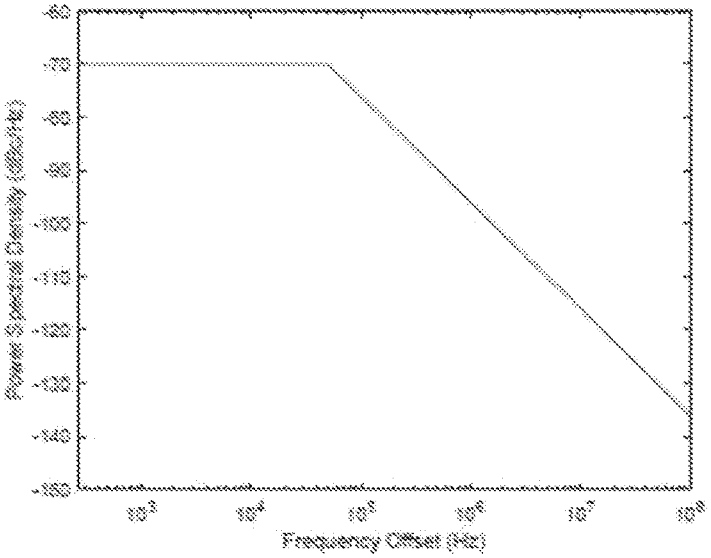
FIG. 1C shows a graph of phase noise spectrum LO locked at 2 GHz used in a simulation, according to embodiments of the disclosure.

Embodiments herein recognize that in RF applications, the phase noise is typically characterized in the frequency domain. The spectrum of an ideal noiseless sinusoidal oscillator operating at frequency f0 is a delta function as shown in FIG. 1A. In an actual oscillator, however, the noise injected into an oscillator by its constituent devices and by external means influence the oscillation instantaneous frequency. The resulting spectrum exhibits "skirts" around the carrier frequency as shown in FIG. 1B. An example of a phase noise spectrum of an LO centered at f0=2 GHz is shown in FIG. 1C. With a phase noise of −130 dBc/Hz at 50 MHz offset and assuming oscillator power consumption of 5 mW, this phase noise spectrum corresponds to a figure-of-merit (FOM) of 155 dB, which is typical of a ring oscillator. Compared to the more conventional LC-based oscillator, the ring oscillator is noisier but enjoys implementation benefits in complexity, scalability, and tuning range, all of which are essential requirements in emerging wideband receiver architectures. Therefore, the phase noise spectrum in FIG. 1C is subsequently used to obtain the preliminary results.

Local oscillator phase noise is a major impairment that degrades the performance of communication receivers. There are two mechanisms by which the phase noise distorts the desired signal. In the first, the desired signal is distorted primarily by the phase noise spectrum near the carrier frequency. In the other, the outer skirts of the phase noise spectrum corrupt the desired signal via reciprocal mixing of interfering blockers.

2.1 Close-In Phase Noise Distortion

Figure 2A:
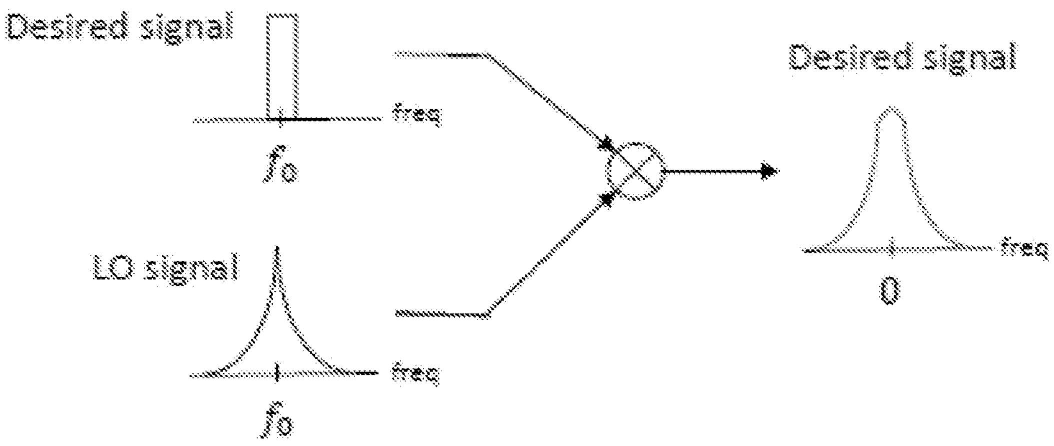
FIG. 2A shows a LO phase noise effect of a desired signal by itself, according to embodiments of the disclosure.

Consider the received signal spectrum with only the desired signal and no interferer present as shown in FIG. 2A. In addition to shifting the received signal spectrum by f0 to baseband, the LO mixing introduces random phase modulation to the desired signal. Since the LO phase noise multiplication in time corresponds to convolution in the frequency domain, the phase noise smears the desired signal spectrum with the majority of the distortion coming from the phase noise frequency components near the carrier frequency. This close-in phase noise distortion is especially problematic in high data rate communication systems that employ large constellation sizes.

Embodiments herein recognize that extensive body of literature exists in compensating for close-in phase noise distortion in the absence of interfering blockers. To compensate for the random phase modulation of the desired signal, the phase noise itself needs to be first estimated, but extracting the phase noise from the downconverted baseband samples alone is challenging. In some examples, an additional path that senses the LO output directly is employed together with the baseband samples to estimate the phase noise. One example uses an additional mixer with a delay line for self-downconversion of the LO signal, and another example uses the time-to-digital converter (TDC) of a digital PLL to sense the LO output. In the former approach, the long delay line may be difficult to implement in practice, while the latter approach requires a high-resolution TDC with attendant power consumption and implementation complexity.

A more popular approach to estimating the phase noise is based on known pilot signals that are inserted in the transmitted data stream. Such data-aided phase noise estimation has been widely studied (and employed) in the context of OFDM, which is especially susceptible to phase noise because each subcarrier bandwidth is comparable to the phase noise spectral bandwidth. The LO phase noise manifest in two ways in OFDM-common phase error (CPE), which is an identical rotation in all subcarriers, and inter-carrier interference (ICI), which is the loss of orthogonality among the subcarriers. CPE is readily estimated in each OFDM symbol based on scattered pilot subcarriers. By comparison, ICI is much harder to compensate as it requires estimation of multiple spectral components (instead of a single one as in CPE). Various approaches based on interpolation and iterative algorithmic techniques have been presented all with different levels of success.

2.2 Reciprocal Mixing

Figure 2B:
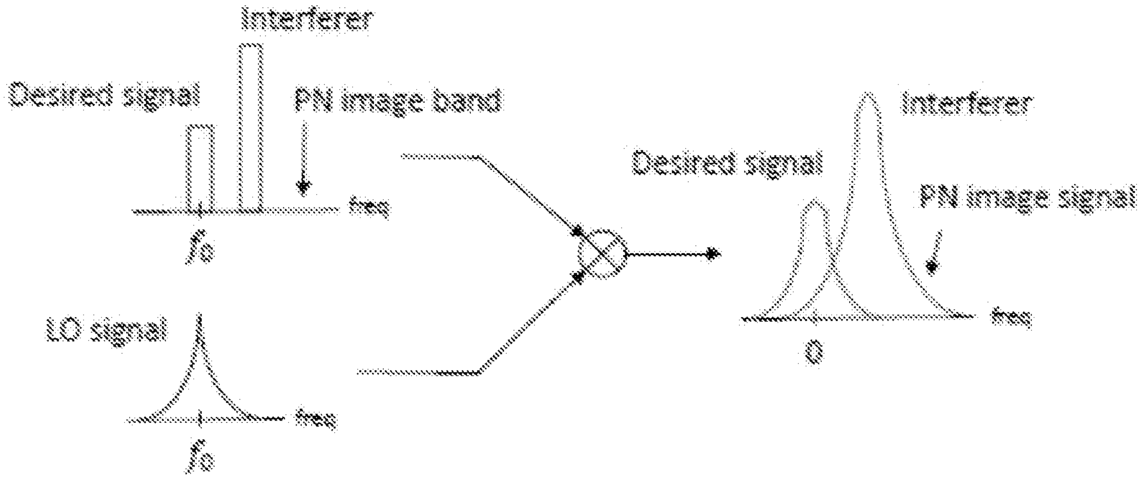
FIG. 2B shows a LO phase noise effect in the presence of adjacent interferer, according to embodiments of the disclosure.

Embodiments herein recognize that when the received signal is accompanied by a large interferer as shown in FIG. 2B (ignore the PN image signal for now), the LO phase noise distorts the desired signal via two mechanisms. First, the desired signal itself is distorted by the close-in phase noise. The other mechanism is by the noisy LO spreading the interferer spectrum, causing the tail of the resulting spectrum to fall on top of the desired signal band. This reciprocal mixing can be reduced by attenuating the interferer prior to the LO mixing and/or by suppressing the phase noise spectral density at offsets far from the carrier frequency. Unfortunately, neither approaches are practical in wideband receivers, because off-chip SAW filtering is not performed to provide reconfigurability, and high-Q tanks for low phase noise are not only difficult to implement on-chip but limit the tuning range.

Compared to close-in phase noise distortion, there is very little existing work on compensating for the effects of reciprocal mixing. The primary reason for such dearth of prior work is its difficulty, since reciprocal mixing compensation has been determined to require knowledge of not only the phase noise, which is in itself a challenge to estimate, but also the interferers that are often centered at unknown frequencies and generally not digitized for further processing. The only prior work currently knowns is from the same research group. The general idea is to exploit the symmetrical properties of the phase noise spectrum by subtracting the signal at twice the blocker offset, which the authors refer to as the phase noise image signal (see FIG. 2B), from the corrupted desired signal. This approach suffers from several practical issues. It requires that the phase noise image band be signal-free, which is generally not the case since the received signal spectrum is highly congested in reality. Furthermore, this approach requires accurate knowledge of the dominant blocker frequency to locate the phase noise image band. In that research, a PLL was used to estimate the dominant interferer blocker frequency, but that may not work if the blocker is wideband or if multiple blockers are present. Consequently, this approach is quite limited in its applicability, and to current knowledge, no practical solution to compensating the effects of reciprocal mixing exists to date.

3 Phase Noise Reduction

Embodiments herein provide a general approach to reduce the phase noise distortion in communication systems. The key idea is to architect the analog front-end (AFE) so that the vector space spanned by the desired signal differs from the phase noise distortion subspace. In existing AFEs, by contrast, the desired signal and the phase noise induced distortion span the same vector subspace. As a result, additional side information is needed to estimate the phase noise that is subsequently used to compensate for its effects. Embedded pilot tones and sensing of the LO output provide the necessary additional information to suppress the close-in phase noise distortion; but for reciprocal mixing, no effective compensation approach exists to date. The presented approach compensates the effects of both close-in phase as well as reciprocal mixing without making any assumptions on the received signal spectrum, the availability of pilot tones, or knowledge of the dominant blockers.

3.1 Overview of Approach

Consider the received RF signal rRF(t) as given by:

$$r_{RF}(t) = \mathfrak{R}\{(s(t) + I(t))e^{jk\omega_{IF}t}\} \tag{1}$$

where s(t) is the desired complex baseband equivalent signal that is bandlimited over the interval [−fs/2, fs/2] and all signals outside this interval including blockers are represented by I (t); ωIF is the receiver IF frequency in radians; and k is an integer value such that kwIF represents the desired signal carrier frequency.

Figure 3:
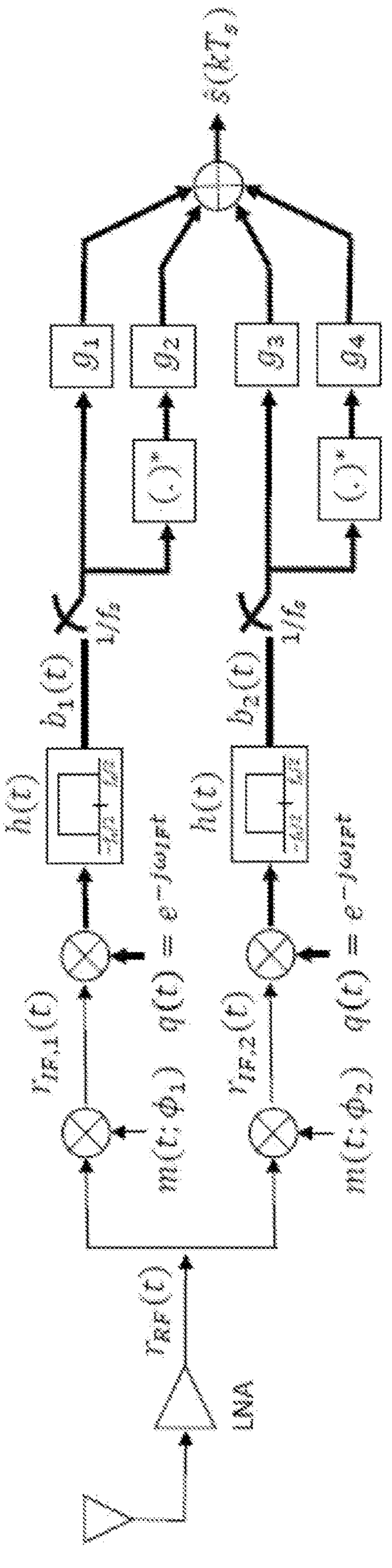
FIG. 3 shows a block diagram/schematic of a receiver, according to embodiments of the disclosure.
Figure 4:
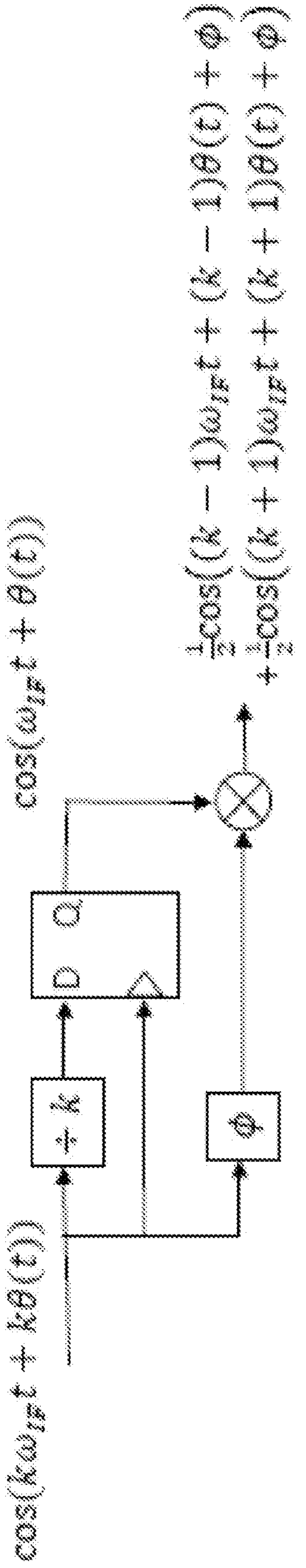
FIG. 4 shows a schematic view of a component for generating m(t;Φ), according to embodiments of the disclosure.

A simplified block diagram of a receiver is shown in FIG. 3. The received signal rRF(t) is first downconverted to an IF at ωIF then to baseband. What distinguishes this receiver architecture from a standard low-IF receiver is the use of the two-tone RF LO m(t; P), which is given by:

$$m(t;\phi) = \alpha_m\cos((k-1)\omega_{IF}t + (k-1)\theta(t) + \phi) + \alpha_p\cos((k+1)\omega_{IF}t + (k+1)\theta(t) + \phi) \tag{2}$$

where θ(t) is the phase noise, and φ is the phase offset. The RF LO m(t; q) consists of two tones with amplitudes $a_m$ and ap corresponding to frequencies at (k−1)

ωIF and (k+1) ωIF, respectively. The phase noise of each tone is scaled linearly with frequency, i.e., the phase noise of the tone at frequency (k−1) ωIF is (k−1)θ(t) while the tone at (k+1) ωIF is (k+1)θ(t). There are several ways to generate m(t; q) in practice. One approach is illustrated in FIG. 4. The frequency synthesizer output operating at kωIF with phase noise kθ(t) is divided by k with a retiming flip-flop. The resulting tone at ωIF is then multiplied with φ shifted PLL output to obtain m(t; φ) with $\alpha_m$=αp. In practice, the multiplication would be performed using a commutating mixer, which would create harmonic tones. To reduce the harmonics generated, harmonic rejection mixer with multiple clock phases may be used. In one embodiment, the RF LO m(t; φ) can comprise first and second tones, e.g., two tones with amplitudes $a_m$ and ap corresponding to frequencies at (k−1) ωIF and (k+1) ωIF, respectively.

Figure 5:
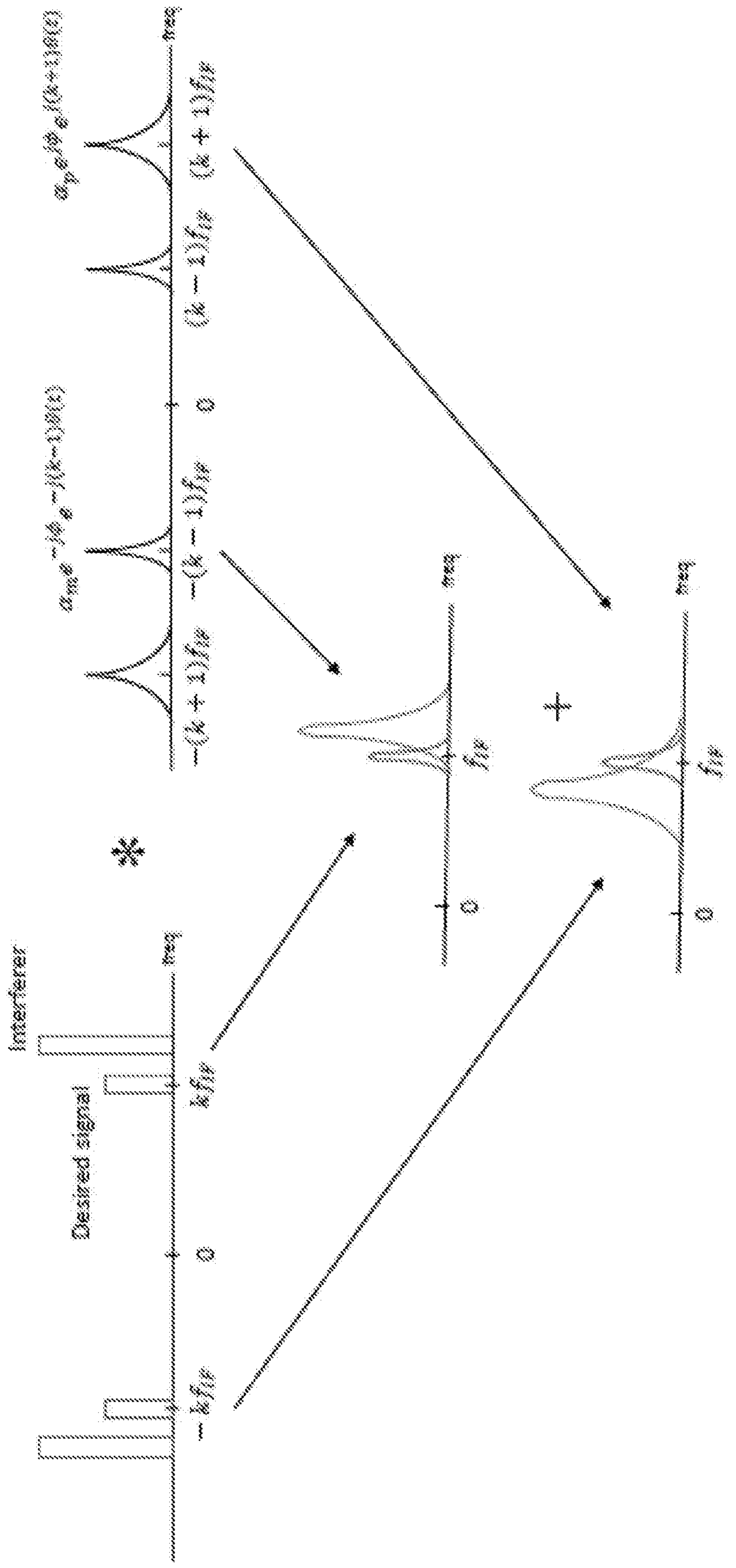
FIG. 5 shows mixing operation of rRF(t) with m(t;φ), according to embodiments of the disclosure.

The multiplication of rRF(t) with m(t; φ) is illustrated in FIG. 5. At the IF frequency fIF (=ωIF/2π), the downconverted signal consists of two terms: the convolution of the positive RF signal with the negative lower frequency tone; and the convolution of the negative RF signal with the positive upper frequency tone. Since the phase noise of each tone differs by a scale factor (i.e., −(k 1)θ(t) vs. (k+1)θ(t)), the resulting phase noise distortion terms also differ with the higher frequency tone causing greater distortion as shown in FIG. 5. In the following subsection, it is shown that this unequal weighting of the phase noise coupled with the use of an additional RF receive chain path that mixes with a different phase offset φ in (2) provides the necessary degrees of freedom to decouple the desired signal s(t) from reciprocal mixing and close-in phase noise distortion.

After mixing with m(t; φ1) and m(t; (2), the resulting IF signals rIF,1(t) and rIF,2(t) are quadrature mixed by q(t) =exp{−jωIFt} to generate complex baseband signals (denoted by bold lines in FIG. 3) then lowpass filtered by h(t), whose bandwidth is fs/2 so to pass only the desired signal s(t). In the overview description of the receiver, image signals at (k+2) ωIF are ignored for ease of explanation because they can be suppressed using well-known image-rejection filters. It is also assumed that the phase noise of the IF LO q(t) is negligible compared to that of the RF LO m(t; φ), since the phase noise power spectral density is proportional to the square of the carrier frequency. For example, if the IF is one-tenth the carrier frequency, the phase noise of the IF LO is reduced by 20 dB compared to the RF LO assuming the same power and oscillator FOM. The image signals, IF LO phase noise, intermodulation distortion, and other circuit non-idealities are discussed further in the research plan section.

As shown in FIG. 3, the sampled baseband signals are weighted then summed to extract the desired signal s(t). If zero-forcing equalization is performed (as described in the next subsection), the weights {g1, g2, g3, g4} can be computed a priori as they depend only on the receiver front-end parameters (i.e., αm, αp, φ1, φ2, and k) and not on the interferer blockers or desired signal statistics. Furthermore, as the same weights suppress both the close-in phase noise and reciprocal mixing distortion, the receiver simply weighs then sums the baseband samples to estimate the desired signal s(t) regardless of whether blocking interferers are present or not. Additional compensation can also be performed subsequently by exploiting any available system side information such as pilot tones.

3.2 System Modeling and Baseband Processing

The complex baseband signal b1(t) (or b2(t)) can be readily shown from FIG. 3 to be:

$$b_1(t) = \left[\alpha_m(s(t)+I(t))e^{-j\phi_1}e^{-j(k-1)\theta(t)} + \alpha_p(s^*(t)+I^*(t))e^{j\phi_1}e^{j(k+1)\theta(t)}\right] * h(t) \tag{3}$$

Since |θ(t)|<<1, (3) can be approximated by applying $e^{jk\theta(t)}$≈1+jkθ(t) to obtain:

$$b_1(t) \approx \alpha_m e^{-j\phi_1}(s(t) - j(k-1)v_s(t) - j(k-1)v_I(t)) + \alpha_p e^{j\phi_1}(s^*(t) + j(k+1)v_s^*(t) + j(k+1)v_I^*(t)) \tag{4}$$

where $v_s(t)$ and $v_I(t)$ represent the close-in and reciprocal mixing distortion terms, respectively, i.e., $$v_s(t) = s(t)\theta(t) * h(t) \text{ and } v_I(t) = I(t)\theta(t) * h(t).$$

Note that the gain coefficients of $v_s(t)$ and $v_I(t)$ in (4) (as well as their conjugates $v_s$*(t) and $v_I$*(t)) are the same, suggesting that the desired signal distortion from close-in phase noise and reciprocal mixing are indistinguishable and can be combined as a single noise source.

To understand the benefit of mixing with a two-tone RF LO m(t; φ), the baseband signals $b_1$(t) and $b_2$(t) and their conjugates can be represented in matrix form as:

$$\begin{bmatrix} b_1(t) \\ b_1^*(t) \\ b_2(t) \\ b_2^*(t) \end{bmatrix} = \begin{bmatrix} \alpha_m e^{-j\phi_1} & \alpha_p e^{j\phi_1} & -j\alpha_m e^{-j\phi_1}(k-1) & j\alpha_p e^{j\phi_1}(k+1) \\ \alpha_p e^{-j\phi_1} & \alpha_m e^{j\phi_1} & -j\alpha_p e^{-j\phi_1}(k+1) & j\alpha_m e^{j\phi_1}(k-1) \\ \alpha_m e^{-j\phi_2} & \alpha_p e^{j\phi_2} & -j\alpha_m e^{-j\phi_2}(k-1) & j\alpha_p e^{j\phi_2}(k+1) \\ \alpha_p e^{-j\phi_2} & \alpha_m e^{j\phi_2} & -j\alpha_p e^{-j\phi_2}(k+1) & j\alpha_m e^{j\phi_2}(k-1) \end{bmatrix} \begin{bmatrix} s(t) \\ s^*(t) \\ v(t) \\ v^*(t) \end{bmatrix} \tag{5}$$

where v(t)=$v_s$(t)+$v_I$(t) is the combined phase noise induced distortion term. Denote (5) as b(t)=Ax(t) with A=[$\alpha_1$, $\alpha_2$, $\alpha_3$, $\alpha_4$], where ax is the kth column vector. The objective is to estimate s(t) based on observations b(t). Fortunately, for different choices of $\emptyset_1$ and $\emptyset_2$ (e.g., 0 and π/2), $\alpha_m$=$\alpha_p$, and k∈$Z^+$, matrix A can be shown to be full rank, which implies that the desired signal column vector $\alpha_1$ is not in the subspace spanned by $\alpha_2$, $\alpha_3$, and $\alpha_4$. Therefore, based on b(t), the desired signal s(t) can be extracted while suppressing s*(t), v(t), and v*(t). Such decoupling of s(t) from the distortion terms is enabled by the use of the two-toned RF LO m(t; ø) in (2). Embodiments herein recognize that if a single-tone RF LO as in a conventional low-IF receiver is employed instead, which corresponds to setting $\alpha_m$ (or $\alpha_p$) to zero for both m(t; φ1) and m(t; φ2), the matrix A in (5) devolves to rank two and s(t) cannot be extracted from b(t). To achieve full rank while employing a single tone for downconversion, one approach is to set $\alpha_m$ to zero for m(t; φ1) and ap to zero for m(t; ω2) (or vice-versa) so to perform high-side injection mixing for one path and low-side injection mixing for the other. This approach is discussed further herein.

Denoting $A1=[\alpha_2, \alpha_3, \alpha_4]$, the zero forcing (ZF) and minimum mean-squared error (MMSE) equalizers to estimate s(t) can be expressed as:

$$g = \begin{cases} P\frac{1}{A_1}a_1 & ZF \\ R_b^{-1}a_1 & MMSE \end{cases} \tag{6}$$

where $P\perp_{A1}$=I−A1 (A1HA1)−1A1 is the orthogonal projection matrix And Rb is the covariance matrix of observations b(t), which can be readily estimated in practice by averaging L received samples, i.e., $$\hat{R}_b = \frac{1}{L}\sum_{k=0}^{L-1} b(k/f_s)b^H(k/f_s) \tag{7}$$

Using either of these linear equalizers, the desired signal can be estimated as shown in FIG. 3 and becomes:

$$\hat{s}(t) = g^H b(t) \tag{8}$$

Unlike the MMSE equalizer, which requires estimation of the received signal statistics (i.e., the covariance matrix), the ZF equalizer coefficients can be solved a priori without training, since the elements of matrix A depend only on the receiver design parameters and not on the input signal. Hence, the ZF equalizer can be used when estimating the desired signal s(t) in the preliminary results presented in the following subsection.

Accordingly, in reference to a receiver configured according to (3)-(8), there is set forth herein, e.g., a receiver that comprises a first mixer disposed in a first signal path, wherein the first mixer performs mixing of a radiofrequency signal with a first local oscillator signal to provide a first downconverted signal, the first local oscillator signal produced using a signal generator, wherein the radiofrequency signal includes a desired signal; a second mixer disposed in a second signal path, wherein the second mixer performs mixing of the radiofrequency signal with a second local oscillator signal to provide a second downconverted signal, the second local oscillator signal produced using the signal generator; wherein receiver is configured for performing processing of a first observed signal from the first signal path and a second observed signal from the second signal path to extract the desired signal, wherein the first observed signal is produced in dependence on the mixing by the first mixer and wherein the second observed signal is produced in dependence on the mixing by the second mixer. There is also set forth herein, in reference to a receiver configured according to (3)-(8), e.g., the receiver wherein the performing processing includes using a solution to a system of equations to extract the desired signal in the presence of phase noise induced distortion, wherein the receiver is configured to control the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. In one example, control of a local oscillator signal can include use of a multi-toned local oscillator signal, as set forth herein.

There is also set forth herein, in reference to a receiver configured according to (3)-(8), e.g., a method comprising mixing a radiofrequency signal with a first local oscillator signal in a first signal path to provide a first downconverted signal, the first local oscillator signal produced using a signal generator, wherein the radiofrequency signal includes a desired signal; mixing the radiofrequency signal with a second local oscillator signal in a second signal path to provide a second downconverted signal, the second local oscillator signal produced using the signal generator; and performing processing of a first observed signal from the first signal path and a second observed signal from the second signal path to extract the desired signal, wherein the first observed signal is produced in dependence on the mixing of the radiofrequency signal with the first local oscillator signal and wherein the second observed signal is produced in dependence on the mixing of the radiofrequency signal with the second local oscillator signal. There is also set forth herein, in reference to a receiver configured according to (3)-(8), e.g., the method, wherein the performing processing includes using a solution to a system of equations to extract the desired signal in the presence of phase noise induced distortion, wherein method includes controlling the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. In one example, controlling of a local oscillator signal can include use of a multi-toned local oscillator signal, as set forth herein.

3.3 Preliminary Results

To demonstrate the effectiveness of the approach, preliminary simulation results are presented based on the phase noise spectrum in FIG. 1C, which corresponds to a typical ring-oscillator VCO operating at 2 GHz. In the receiver, it is assumed that the IF is 200 MHz (=ωIF/2π), so the RF LO mixer m(t; φ) given in (2) consists of two tones centered at 2±0.2 GHz. The desired signal, which is at carrier frequency 10ωIF/2π=2 GHz, is a 10 MHz OFDM signal consisting of 1 kHz subcarriers each employing a 16 QAM constellation.

Figure 6A:
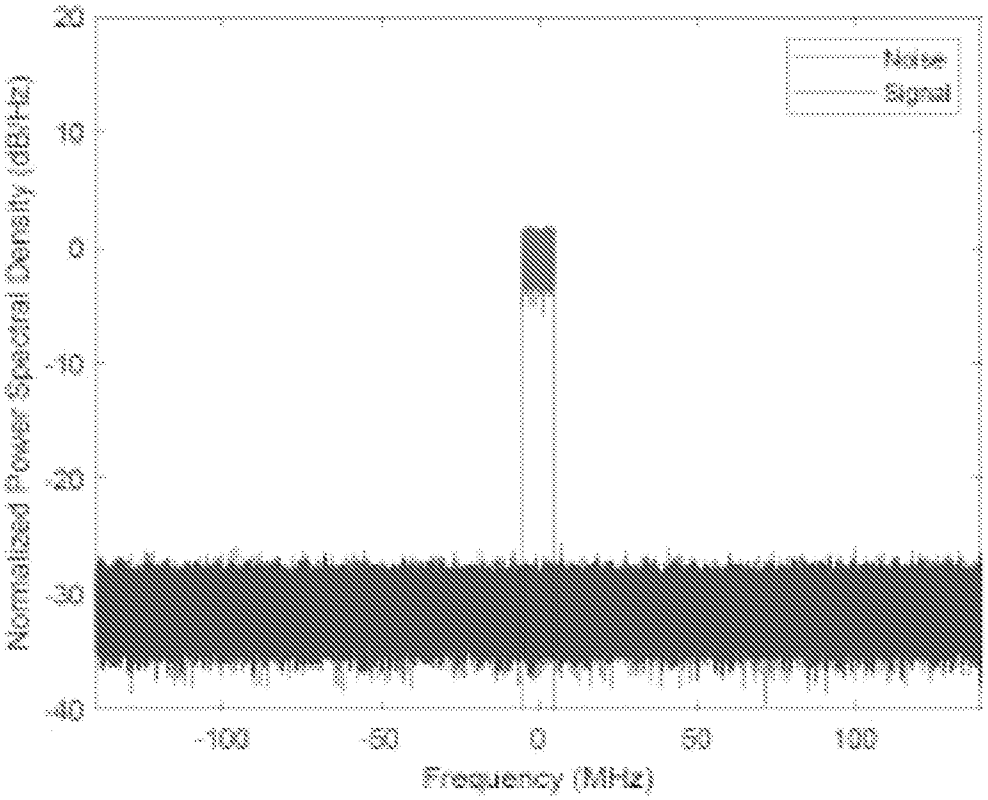
FIG. 6A shows a graph of an RF input spectrum centered at a carrier frequency, according to embodiments of the disclosure.
Figure 6B:
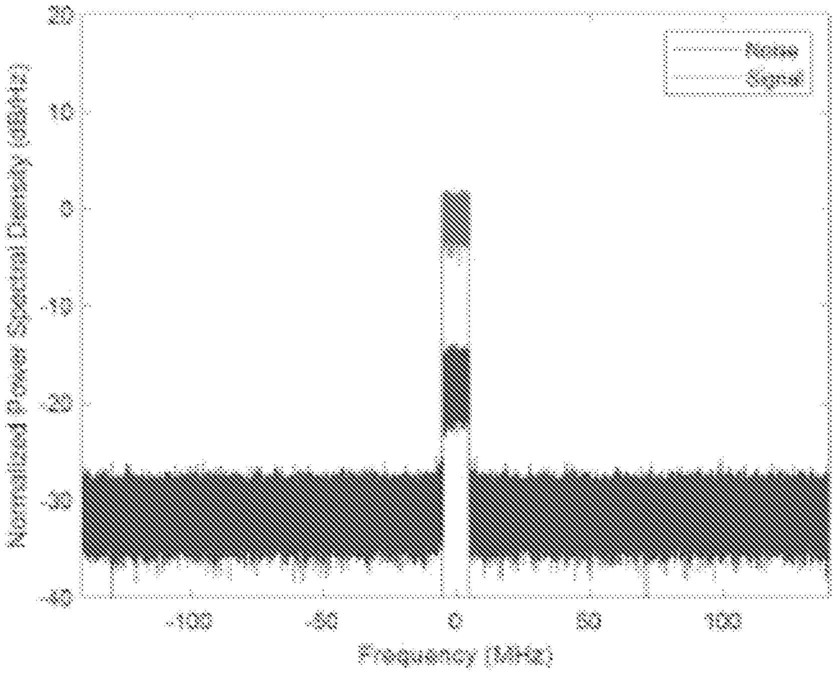
FIG. 6B shows a graph of a receive signal spectrum after downconversion to baseband in a conventional direct-conversion receiver, according to embodiments of the disclosure.
Figure 7A:
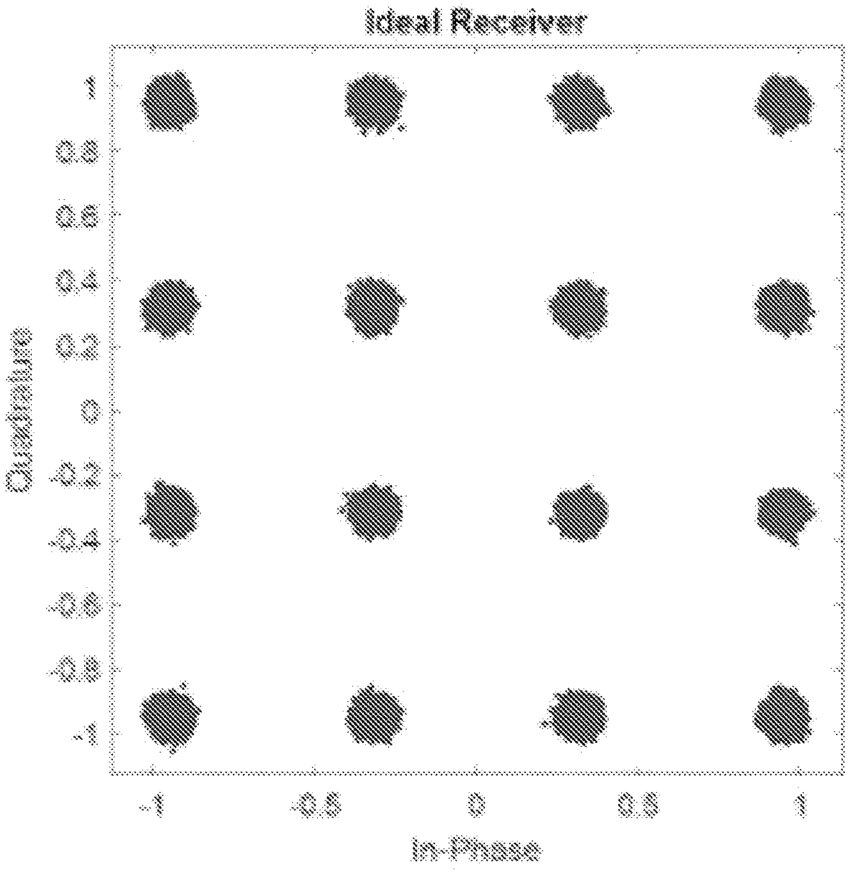
FIG. 7A shows a decoded signal constellation of an ideal receiver, according to embodiments of the disclosure.
Figure 7B:
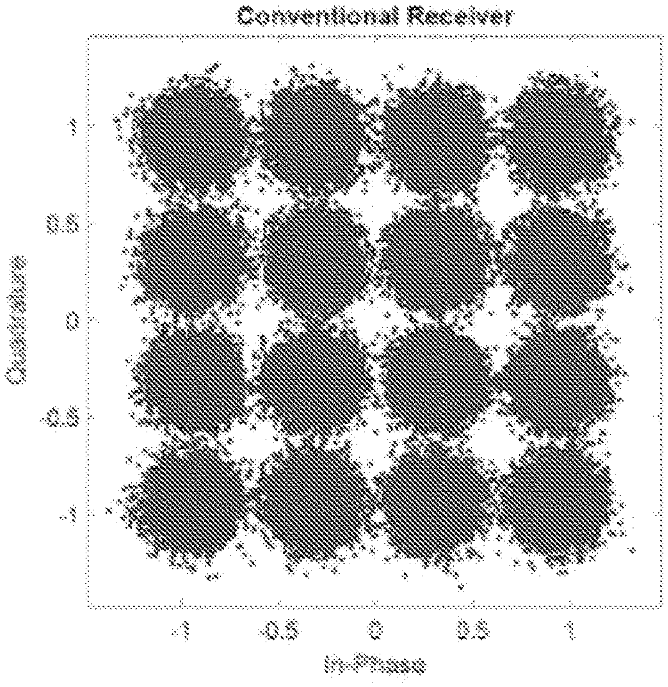
FIG. 7B shows a decoded signal constellation of a conventional receive with phase noise distortion, according to embodiments of the disclosure.
Figure 7C:
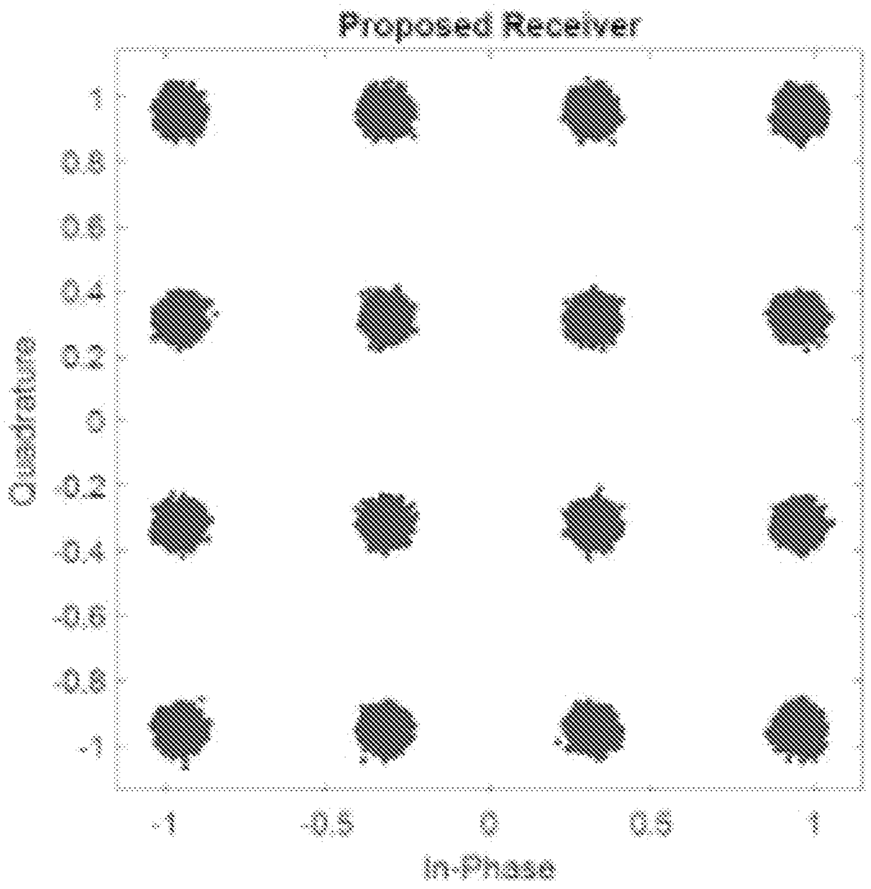
FIG. 7C shows a decoded signal constellation of a receiver after phase noise compensation, according to embodiments of the disclosure.

FIG. 6A shows the RF input spectrum with no blockers, and FIG. 7*a*) is the corresponding constellation of an ideal receiver with no phase noise. The ideal SNR is 30 dB. When a conventional direct-conversion receiver with an LO phase noise spectrum given in FIG. 1C is employed, the resulting spectrum and constellation are shown in FIG. 6B and FIG. 7B, respectively. The raised noise floor in the desired signal band represents the close-in phase noise distortion resulting from the multiplication of the phase noise with the desired signal in the time domain. Finally, FIG. 7C plots the constellation of the receiver after phase noise compensation. The SNR of the receiver is 29.1 dB, which is close to the ideal 30 dB, while the conventional receiver SNR is 16.9 dB (see FIG. 7B). Note that this SNR improvement of over 12 dB is not signal dependent as phase noise correction is performed on a sample-by-sample basis in the time domain with no knowledge of the signal constellation. If embedded pilot tones are available, additional phase noise compensation using existing schemes can be applied after this initial phase noise distortion reduction of the raw received signal.

Figure 8A:
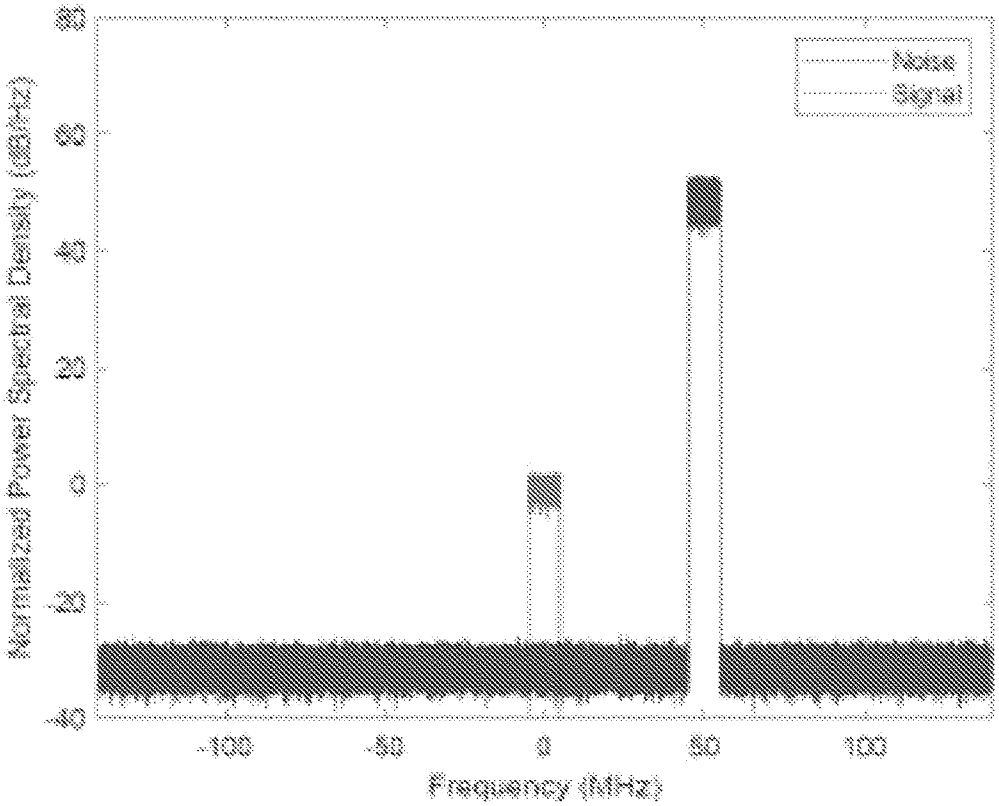
FIG. 8A shows a graph of an RF input spectrum centered at the carrier frequency, according to embodiments of the disclosure.
Figure 8B:
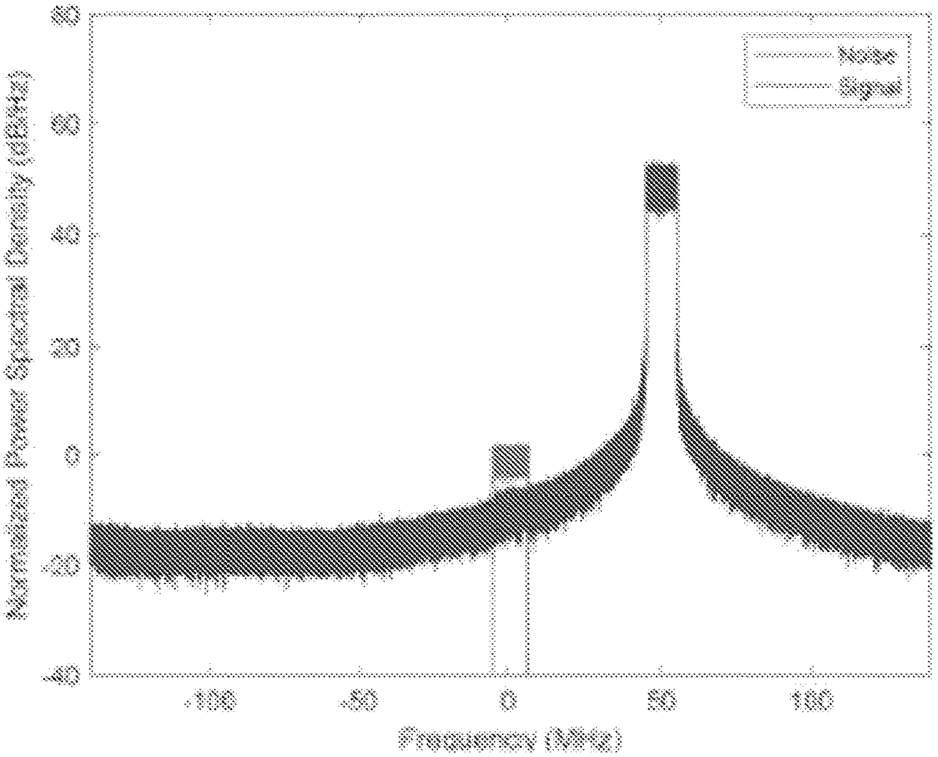
FIG. 8B shows a graph of a received signal spectrum after downconversion to baseband in a conventional direct-conversion receiver, according to embodiments of the disclosure.
Figure 9A:
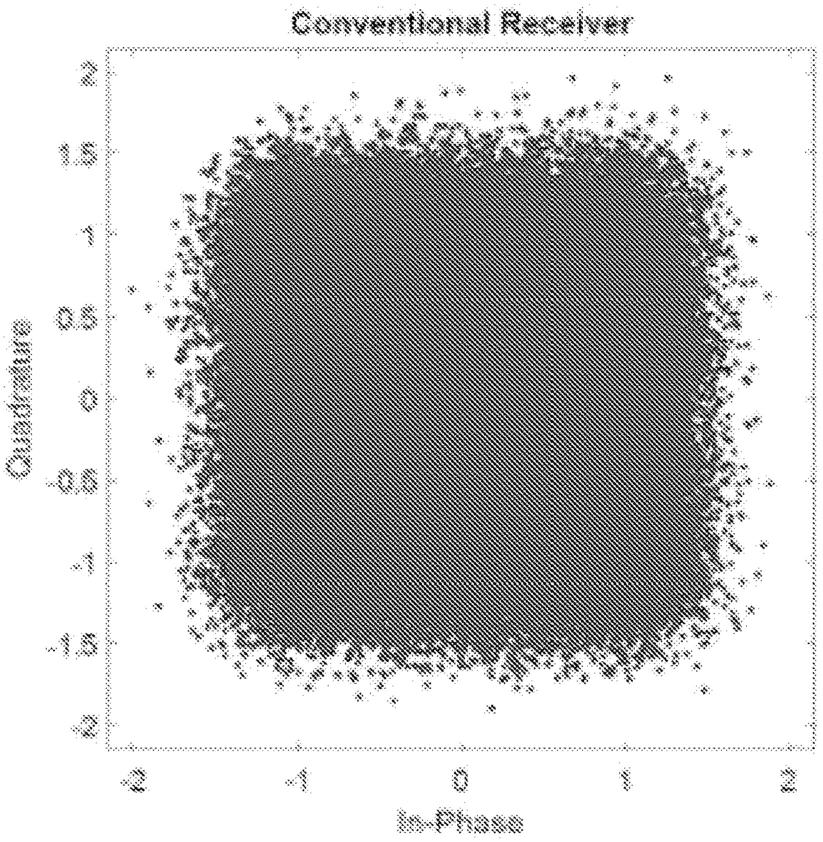
FIG. 9A shows a decoded signal constellation of a conventional receiver with phase noise distortion, according to embodiments of the disclosure.
Figure 9B:
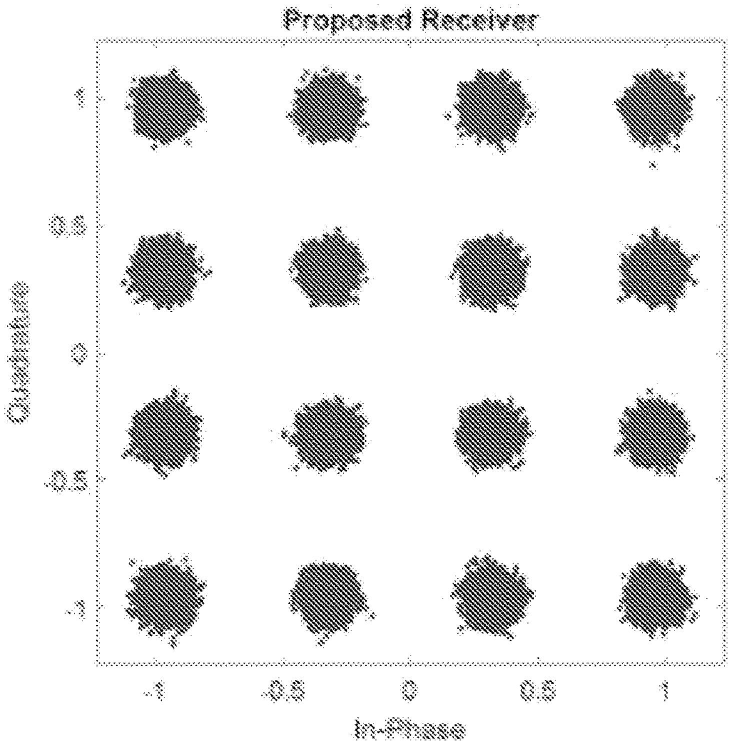
FIG. 9B shows a decoded signal constellation of a receiver after phase noise compensation, according to embodiments of the disclosure.

The interfering blocker effect is considered in FIG. 8A). The interferer has an offset of 50 MHz and is 10 MHz wide. It is modeled as a Gaussian noise that is 50 dB stronger than the desired signal. The downconverted baseband spectrum of a conventional direct-conversion receiver is illustrated in FIG. 8B) with the corresponding constellation shown in FIG. 9A). Clearly, the constellation is unrecognizable due to both close-in phase noise and reciprocal mixing distortion. When the receiver is employed, the constellation is as shown in FIG. 9B), and the resulting SNR is 24.8 dB, which corresponds to a loss of approximately 5 dB compared to the ideal 30 dB, while the conventional receiver SNR is 9.0 dB (see FIG. 9A)). The ZF linear equalizer coefficients employed to suppress both the close-in and reciprocal mixing distortion in FIG. 9B) are the same as those employed to estimate the desired signal in FIG. 7B) in the absence of interfering blockers. Since the equalizer coefficients depend only on the receiver parameters, they can be determined a priori and remain the same whether interfering blockers are present or not. The receiver, therefore, seamlessly compensates for both the close-in phase noise and reciprocal mixing distortions without requiring any training sequences.

Additional Material

Local oscillator phase noise is one of the primary factors that limits the achievable performance in modern communication receivers. There are two mechanisms by which the phase noise degrades the desired signal—the close-in and reciprocal mixing distortion. Although an extensive body of literature exists in compensating for close-in phase noise distortion, there is very little work on compensating for the effects of reciprocal mixing with no practical solution to date. This paper presents an approach to jointly and seamlessly compensate for both the close-in and reciprocal mixing phase noise distortion. A prototype receiver using off-the-shelf components has been built and a 9.4 dB SINR improvement has been demonstrated.

I. Introduction

Local oscillator (LO) phase noise is a major impairment that degrades the performance of communication receivers. There are two mechanisms by which the phase noise distorts the desired signal. In the first, the LO mixing introduces random phase modulation to the desired signal. This phase noise distortion, which is subsequently referred to as close-in phase noise distortion, is especially problematic in high data rate communication systems that employ large constellation sizes. An extensive body of research exists in compensating for close-in phase noise distortion, most of the which rely on the presence of pilot signals.

When the received signal is accompanied by a large interferer, the desired signal not only suffers from close-in phase noise distortion but also reciprocal mixing distortion, which is the spreading of the interferer spectrum by the LO phase noise to the desired signal band. Compared to close-in phase noise distortion, there is very little existing work on compensating for the effects of reciprocal mixing, primarily because of its difficulty. In past studies, which represent the only prior work currently known, reciprocal mixing induced distortion compensation is achieved by exploiting the symmetrical properties of the phase noise spectrum by subtracting the signal at twice the blocker offset, which the authors refer to as the phase noise image signal. The practical shortcomings of this approach is the assumption that phase noise image band is unoccupied, which is generally not the case, and the difficulty of identifying and downconverting the image band, especially if multiple blockers are present. Consequently, this approach is quite limited in its applicability, and to current knowledge, no practical solution to compensating the effects of reciprocal mixing exists to date.

II. Phase Noise Distortion Compensation

A core idea of the compensation approach is to architect the receiver front-end with additional degrees of freedom so that the desired signal spans a different vector space than the subspace spanned by reciprocal mixing and close-in phase noise distortion. The phase noise induced distortions are then removed by simply projecting to their null space. The approach requires only the downconverted desired signal band samples, and it operates seamlessly regardless of the blocker spectrum, number of interferers, and phase noise spectrum.

Consider the received RF signal:

$$r_{RF}(t) = \Re\left\{s(t)e^{j2\pi Mf_{IF}t} + \sum_i I_i(t)e^{j2\pi f_i t} + n(t)\right\} \tag{9}$$

where $\Re\{\cdot\}$ represents the real operation, s(t) is the baseband equivalent desired signal that is bandlimited over the interval [−fs/2, fs/2], fIF (t) is the receiver IF, M is a scaling factor such that MfIF (t) represents the desired signal carrier frequency, Ii(t) is the baseband equivalent ith interferer signal centered at frequency fi, and n(t) is the input-referred additive white Gaussian noise (AWGN).

Figure 10:
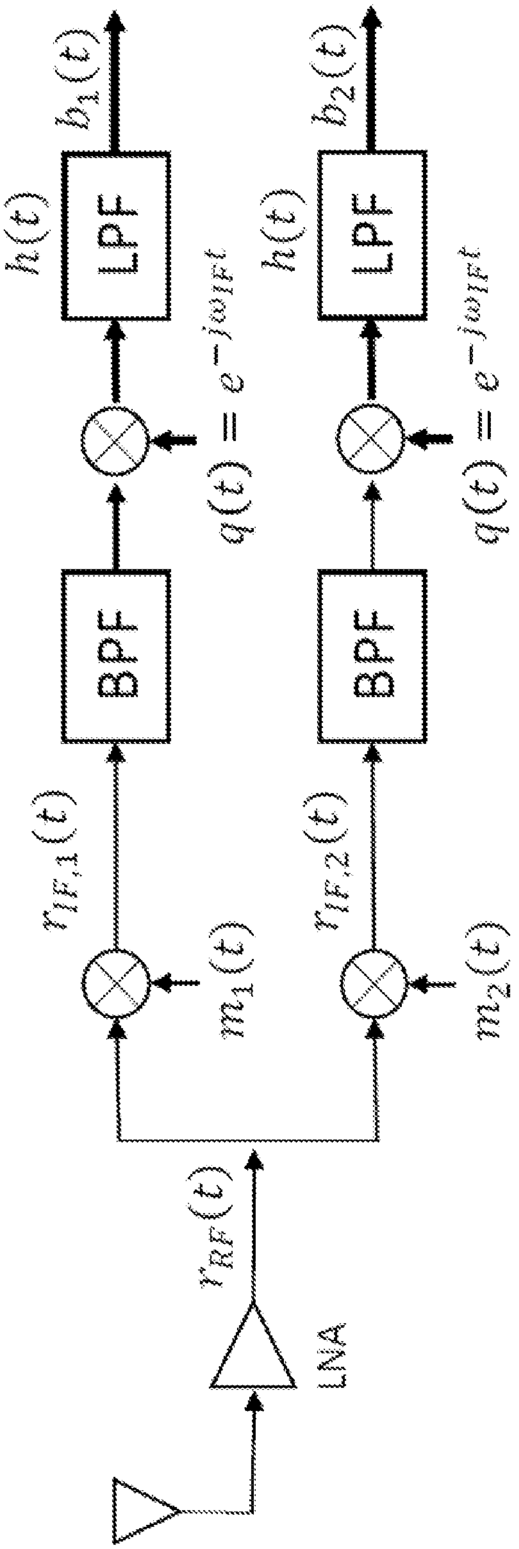
FIG. 10 shows a block diagram of a receiver front-send, according to embodiments of the disclosure.

A simplified block diagram of the receiver is shown in FIG. 10. The received signal rRF(t) centered at MfIF is first downconverted to an IF at fIF then to baseband. In the front-end, one receive chain is a high-side and the other a low-side injection IF receiver. In particular, the LOs are given by:

$$m_1(t) = \Re\left\{e^{j[2\pi(M-1)f_{IF}t+(M-1)\theta(t)+\phi_1]}\right\} \tag{10}$$

$$m_2(t) = \Re\left\{e^{j[2\pi(M+1)f_{IF}t+(M+1)\theta(t)+\phi_2]}\right\} \tag{11}$$

where θ(t) is the phase noise, and Φ1 and Φ2 are the phase offsets of two LOs. For each LO, the phase noise is scaled linearly with frequency, i.e., the phase noise of the tone at frequency (M−1) fIF is (M−1)θ(t) while the tone at (M+1) fIF is (M+1)θ(t). Such LOs can be generated using different frequency multipliers as described in the following section. This proportional phase noise scaling provides the necessary degrees of freedom to decouple the desired signal s(t) from reciprocal mixing and close-in phase noise distortion.

After mixing with m1(t) and m2(t), the resulting IF signals rIF,1(t) and rIF,2(t) are quadrature mixed by q(t)=exp{−j2πfIFt} to generate complex baseband signals (denoted by bold lines in FIG. 10) then lowpass filtered by h(t), whose bandwidth of fs/2 passes only the desired signal s(t). In the overview description of the receiver, it is assumed that the phase noise of the IF LO q(t) is negligible compared to that of the RF LOs m1(t) and m2(t), since the phase noise power spectral density is proportional to the square of the carrier frequency. Additional power can also be expended to further reduce the phase noise of the IF LO, which is much easier to achieve than the RF LO because of the reduced operating frequency.

1) System Modeling and Baseband Processing

Applying ej(M±1)θ(t)≈1+j(M±1)θ(t) since |θ(t)|<<1 and ignoring additive noise terms, the complex baseband signal $b_1(t)$ (see FIG. 10) can be approximated as:

$$b_1(t) \approx e^{-j\phi_1}[s(t) - j(M-1)v_s(t) - j(M-1)v_I(t)] \quad (12)$$

where $v_s(t)$ and $v_I(t)$ represent the close-in and reciprocal mixing distortion terms, respectively, i.e., $$v_s(t) = s(t)\theta(t) * h(t)$$

$$v_I(t) = \left(\sum_i I_i(t)e^{j2\pi(f_i - Mf_{IF})t}\right)\theta(t) * h(t).$$

Similarly, the approximation of $b_2(t)$ becomes $$b_2(t) \approx e^{j\phi_2}[s^*(t) + j(M+1)v_s^*(t) + j(M+1)v_I^*(t)] \quad (13)$$

Note that the gain coefficients of $v_s(t)$ and $v_I(t)$ in (12) (as well as their conjugates $v_s{}^*(t)$ and $v^*(t)$ in (13)) are the same, suggesting that the desired signal distortion from close-in phase noise and reciprocal mixing are indistinguishable and can be combined as a single noise source.

To appreciate the benefit of performing both a low-side and high-side IF mixing with RF LOs m1(t) and m2(t), respectively, the baseband signals b1(t) and b*(t) can be represented in matrix form as:

$$\underbrace{\begin{bmatrix} b_1(t) \\ b_2^*(t) \end{bmatrix}}_{b(t)} = \underbrace{\begin{bmatrix} e^{-j\phi_1} & -je^{-j\phi_1}(M-1) \\ e^{-j\phi_2} & -je^{-j\phi_2}(M+1) \end{bmatrix}}_{A} \underbrace{\begin{bmatrix} s(t) \\ v(t) \end{bmatrix}}_{x(t)} + \underbrace{\begin{bmatrix} n_1(t) \\ n_2(t) \end{bmatrix}}_{n(t)} \quad (14)$$

where $$v(t) = v_s(t) + v_I(t) \quad (15)$$

is the combined phase noise induced distortion term, and n1(t) and n2(t) represent the equivalent additive noise.

Denoting (14) as b(t)=Ax(t)+n(t), the objective is to estimate s(t) based on observations b(t). As the matrix A is full-rank, the desired signal s(t) can be extracted from the corrupted baseband signals b(t). More importantly, since the elements of matrix A are functions only of static receiver parameters (i.e., M, Φ1, Φ2), the approach is effective regardless of the phase noise or the interferer spectrum. Desired signal s(t) can be readily estimated using well-known minimum mean-squared error (MMSE) or zero forcing (ZF) equalizers.

III. Prototype Implementation and Measurement

Figure 11A:
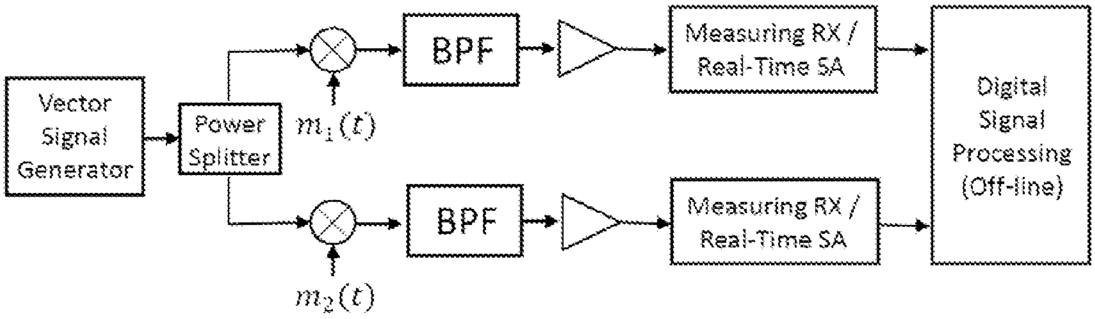
FIG. 11A shows a block diagram of a receiver, according to embodiments of the disclosure.

To experimentally validate the phase noise compensation approach, a prototype receiver is built using discrete components. A block diagram of the receiver signal path is shown in FIG. 11A). The RF signal centered at 2 GHz from a vector signal generator is split using a power splitter. The two outputs are the inputs to the two receive paths. The top path is multiplied by a 1.6 GHz m1(t) signal then bandpass filtered at 400 MHz. The resulting output IF signal is amplified and quadrature downconverted to baseband for digitization using a real-time spectrum analyzer tuned at 400 MHz. The bottom path is the same as the top path except that the split RF signal is multiplied by a 2.4 GHz m2(t) signal.

Figure 11B:
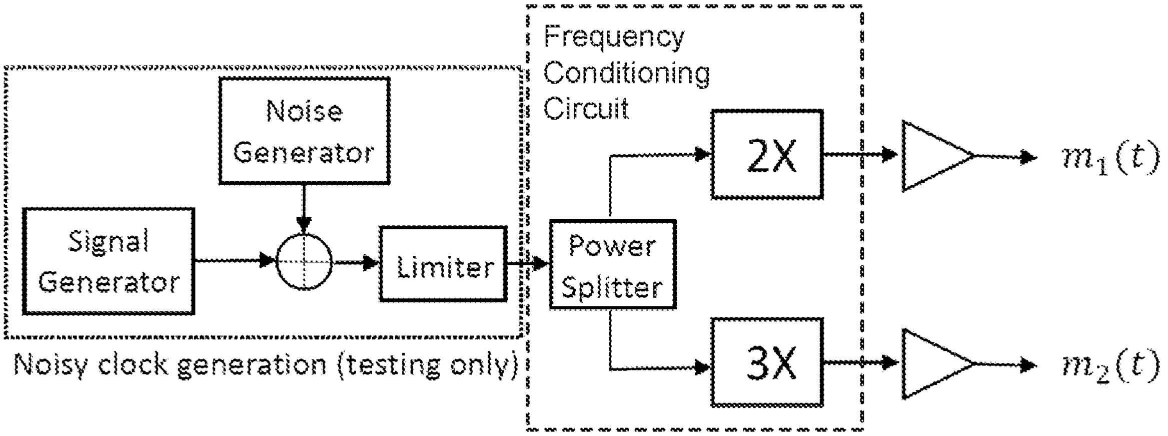
FIG. 11B shows a LO signal generation path, according to embodiments of the disclosure.
Figure 11C:
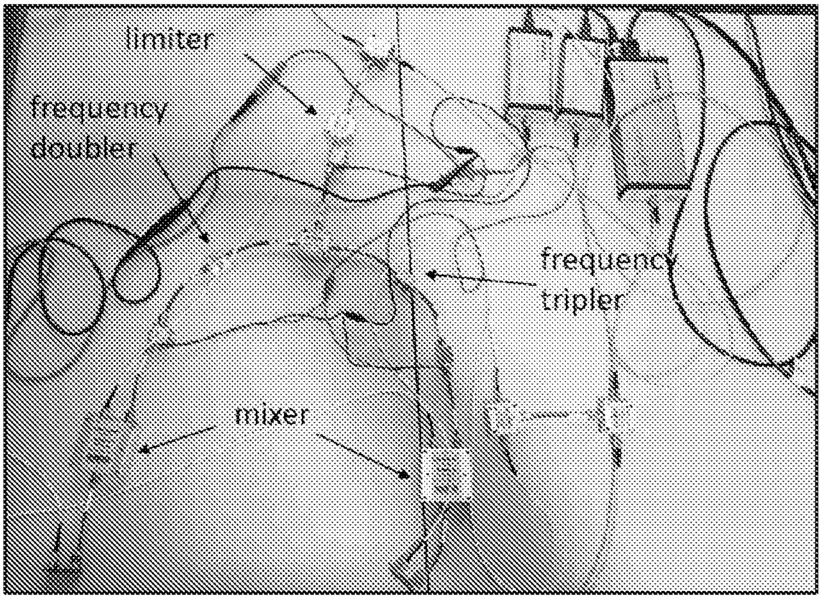
FIG. 11C shows a model of the receiver, according to embodiments of the disclosure.
Figure 19:
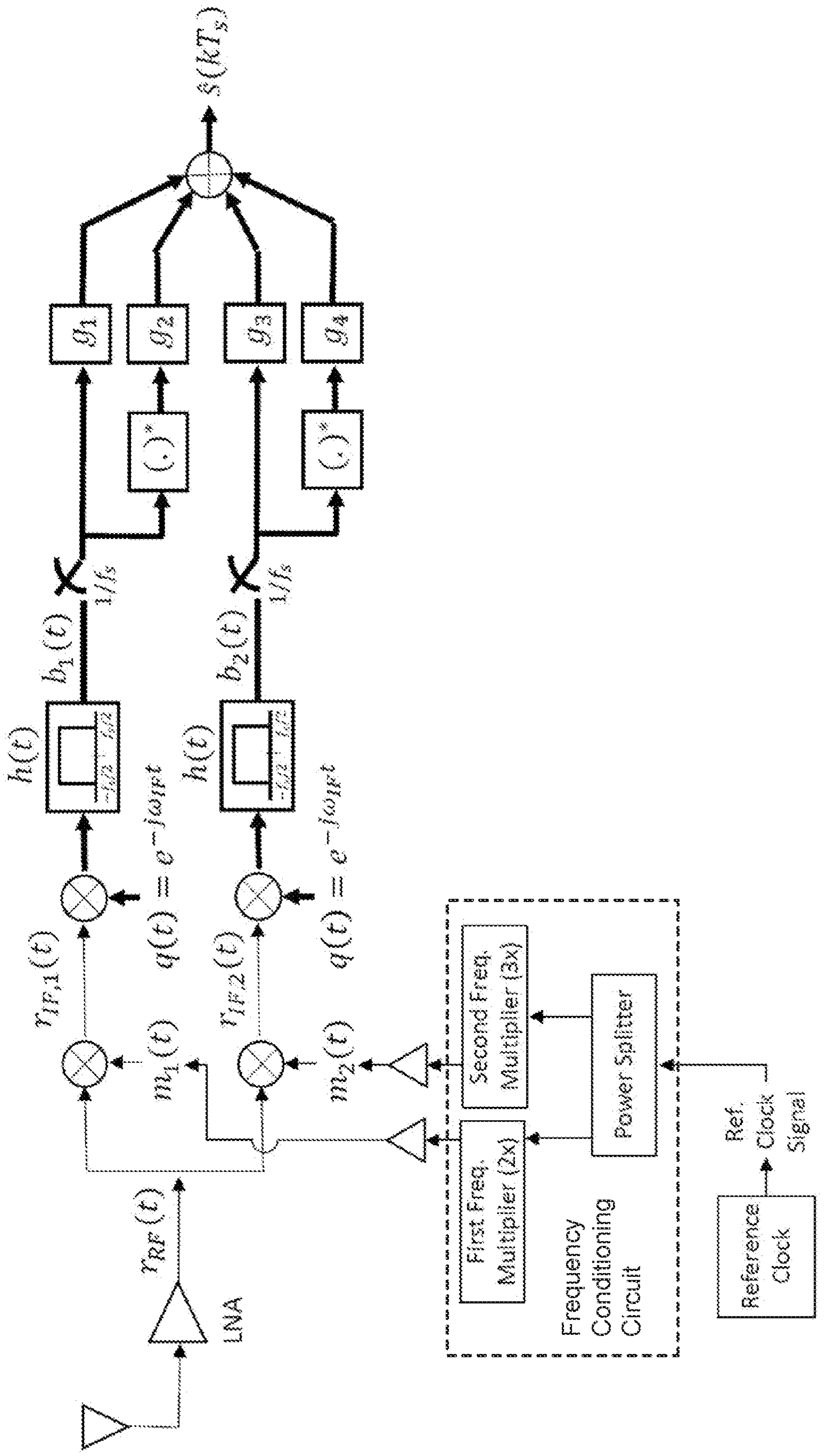
FIG. 19 shows a block diagram/schematic of a receiver, according to additional embodiments of the disclosure.

The LO signals m1(t) and m2(t) with the same phase noise but scaled proportionally with the operating frequency are obtained based on a reference 800 MHz signal generated from a signal generator. A noisy RF LO is modeled by adding a Gaussian noise to the signal generator output followed by a limiter as illustrated in FIG. 11B. The 800 MHz noisy signal is amplified then split using a power splitter. One output passes through a frequency doubler while the other a frequency tripler to generate the corresponding 1.6 GHz and 2.4 GHz LO tones, respectively. The phase noise of the resulting LO signals is proportional as given in (10) and (11) with M=5 and ωIF=400 MHz. A picture of the prototype receiver built using off-the-shelf components is shown in FIG. 11C. Embodiments herein recognize that the signal generator depicted in FIG. 11B is an enhanced signal generator enhanced for illustration of testing results with use of a noise generator and a limiter: A signal generator herein, from which local oscillator signals can be produced, can be provided, e.g., by a reference clock as shown in FIG. 19, which can be defined by an oscillator.

For ease of testing, a 16-QAM signal with a 10 kHz symbol rate is transmitted at 1.9999 GHz carrier frequency. The transmit filter is a square-root raised cosine filter with a roll-off factor of 0.35. To demonstrate the robustness of the approach to the effects of phase noise, the input signal power is set to be sufficiently large at −30 dBm so that the signal-dependent phase noise becomes the dominant source of distortion and the effects of additive white Gaussian noise is negligible.

Figure 12A:
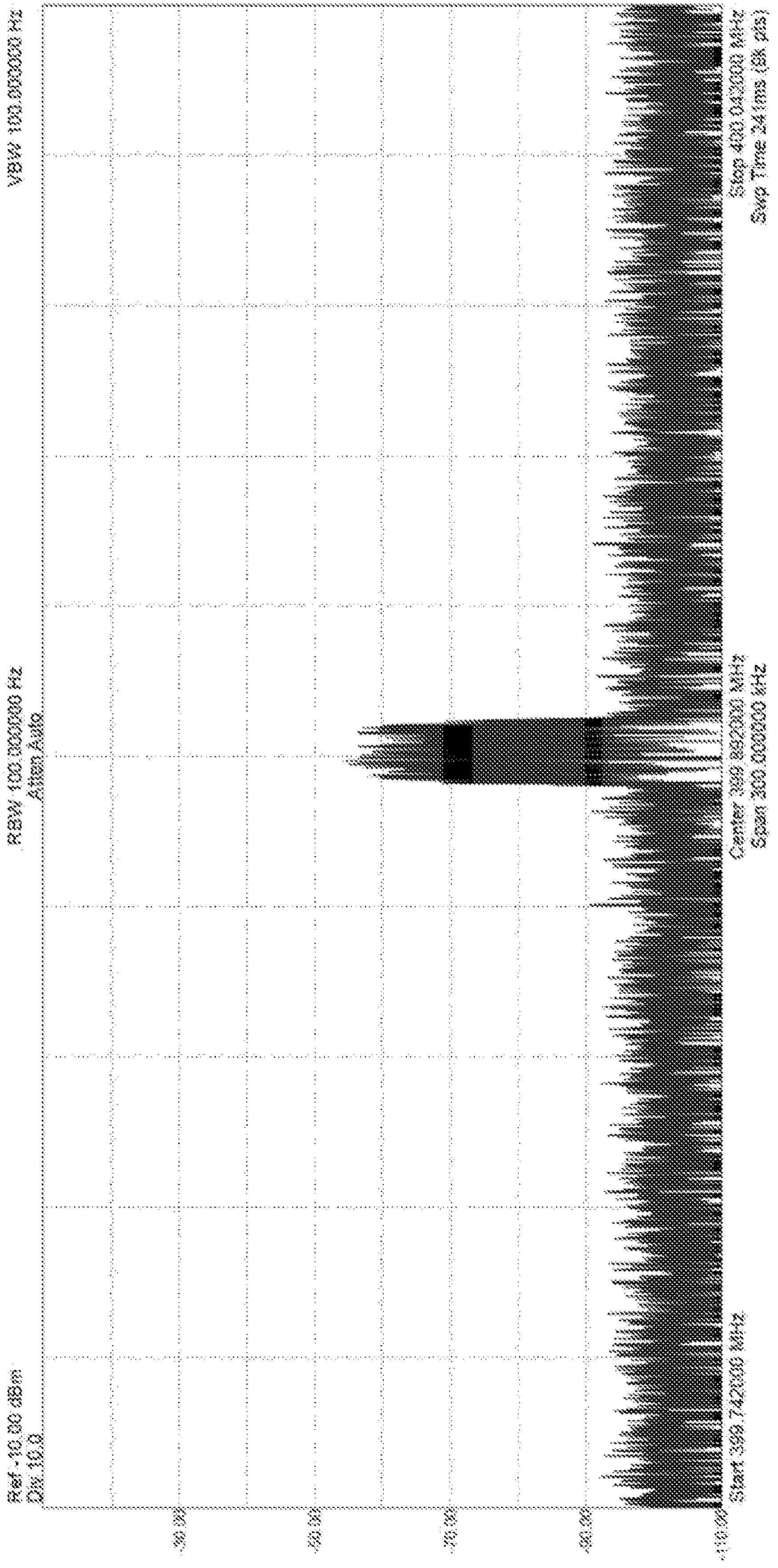
FIG. 12A shows a power spectral density received-signal graph at the IF after low-side injection mixing where no blockers are present, according to embodiments of the disclosure.
Figure 12B:
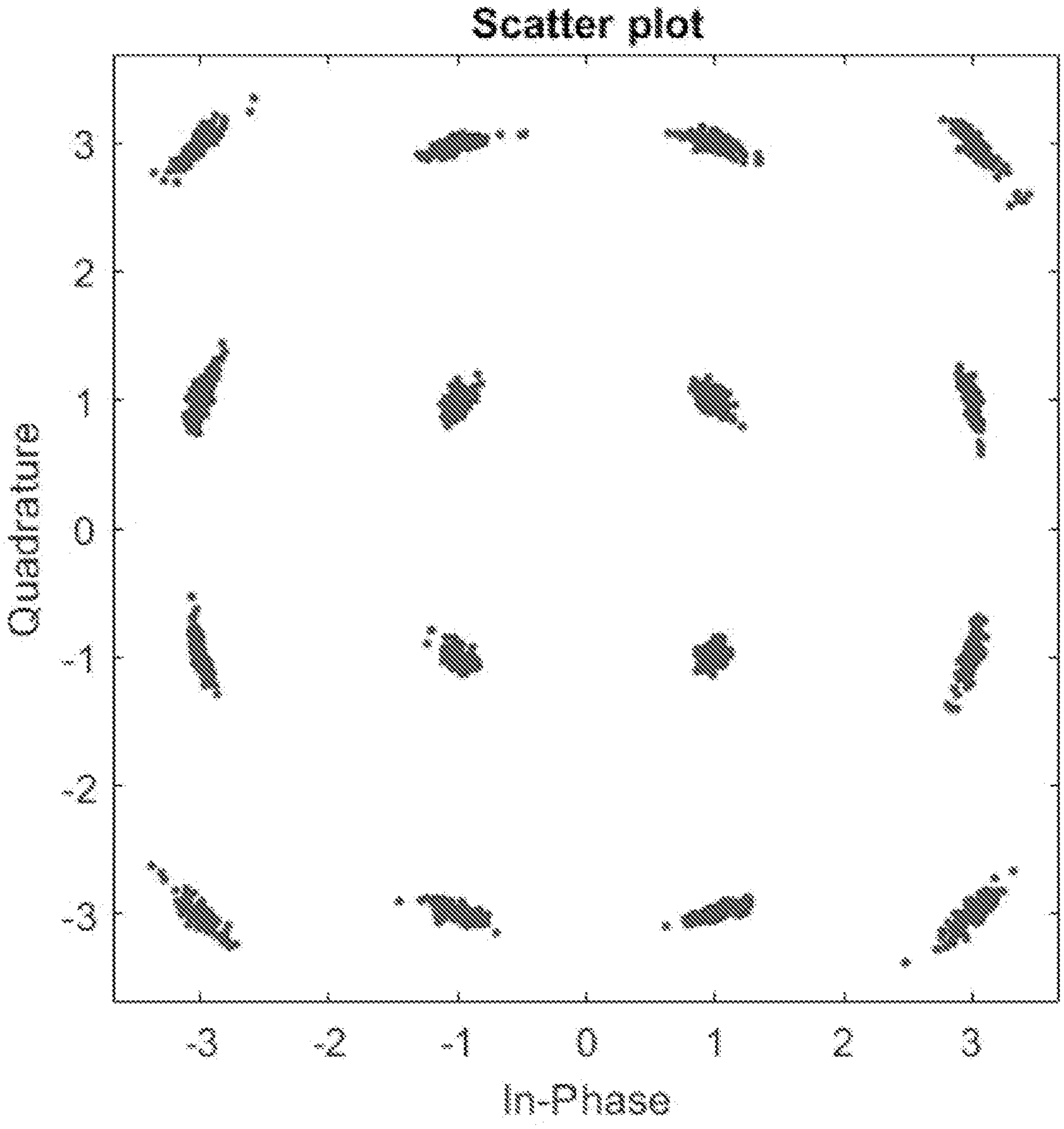
FIG. 12B shows a low-side injection path received-signal graph, according to embodiments of the disclosure.
Figure 12C:
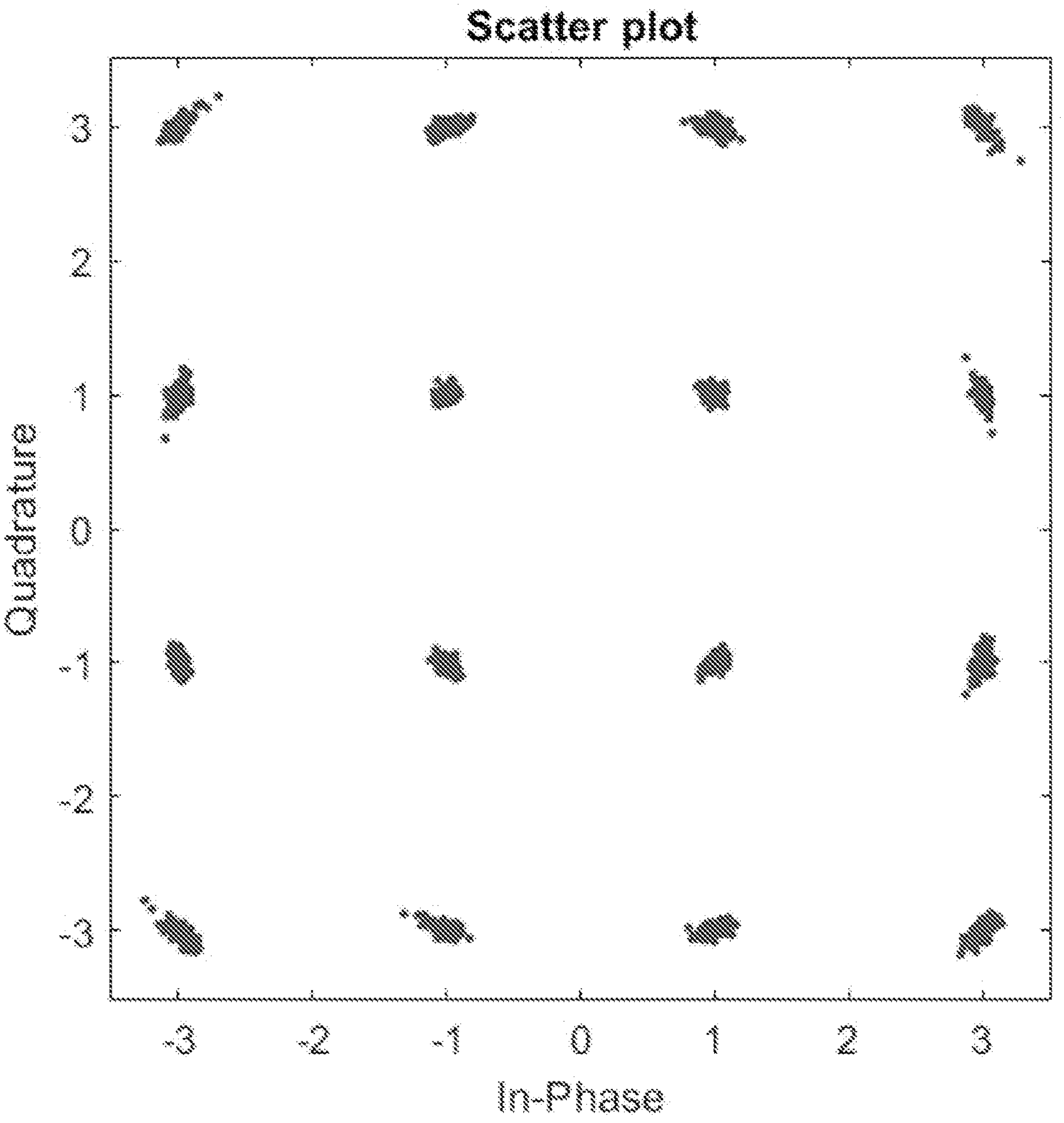
FIG. 12C shows a receiver received-signal graph, according to embodiments of the disclosure.

The IF spectrum of the low-side injection path in the absence of a blocker is shown in FIG. 12A). The noise floor is primarily due to the mixing of the desired signal with LO phase noise. FIG. 12B) plots the decoded constellation, which corresponds to an output SINR of 27.0 dB. Although not shown, the output SINR of the high-side injection path is 24.9 dB. The decoded constellation of the receiver is shown in FIG. 12C) and achieves an output SINR of 32.1 dB, which represents an improvement of 5.1 dB and 6.2 dB compared to the low-side and high-side injection IF receivers, respectively.

Figure 13A:
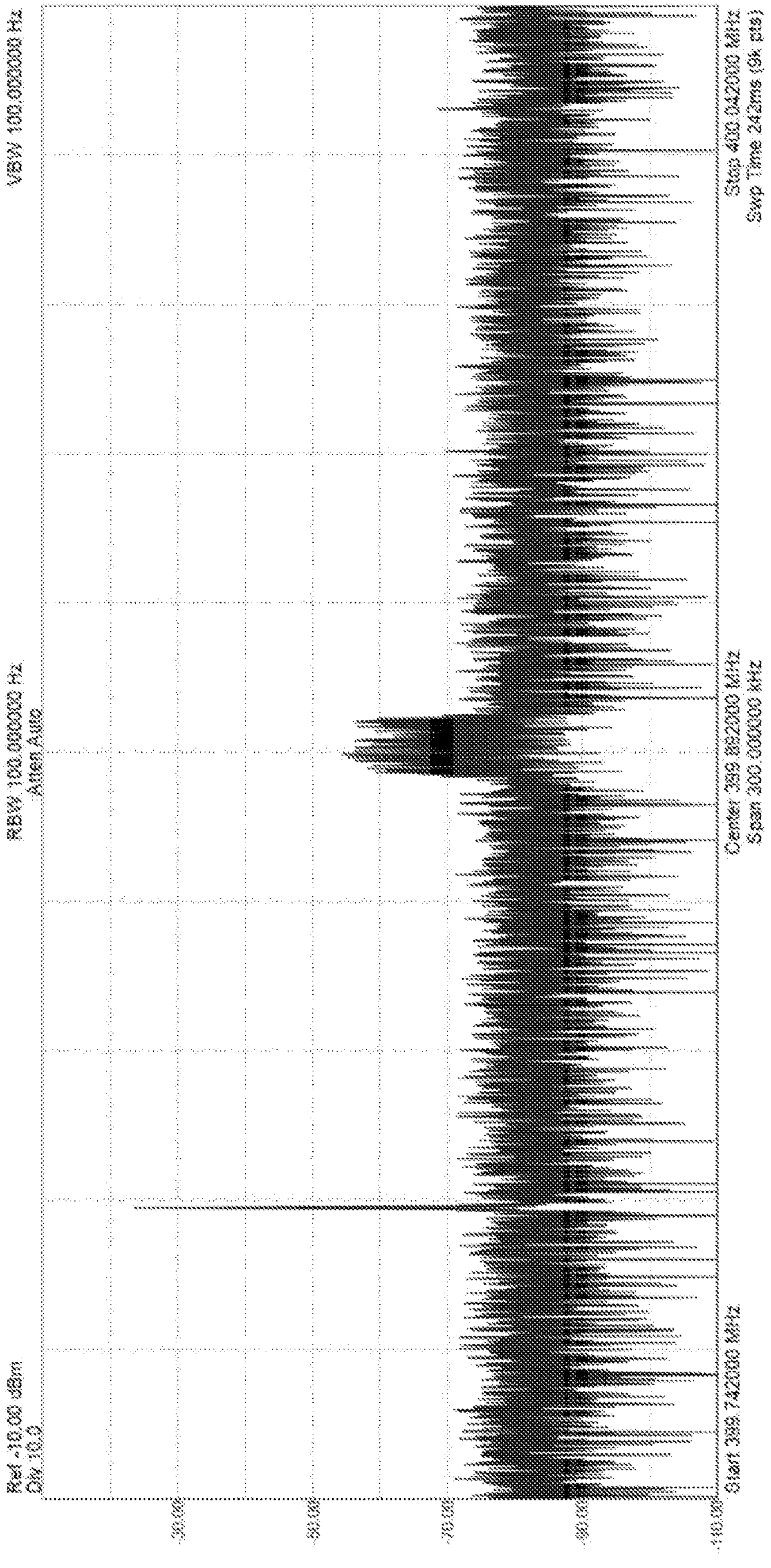
FIG. 13A shows a power spectral density received-signal graph at the IF after low-side injection mixing where a single-tone blocker at 1,998 GHz exists, according to embodiments of the disclosure.
Figure 13B:
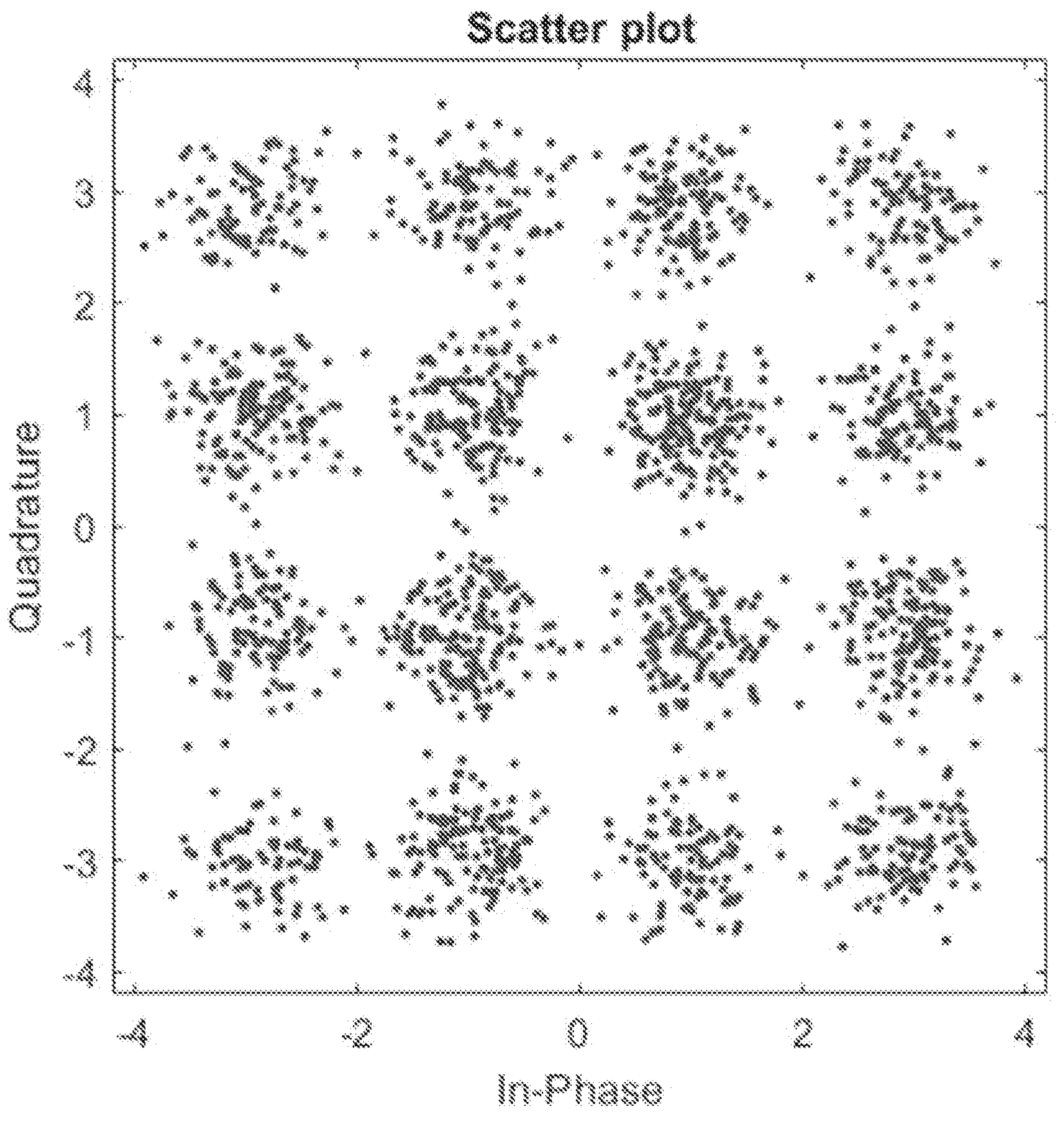
FIG. 13B shows a low-side injection path received-signal graph, according to embodiments of the disclosure.
Figure 13C:
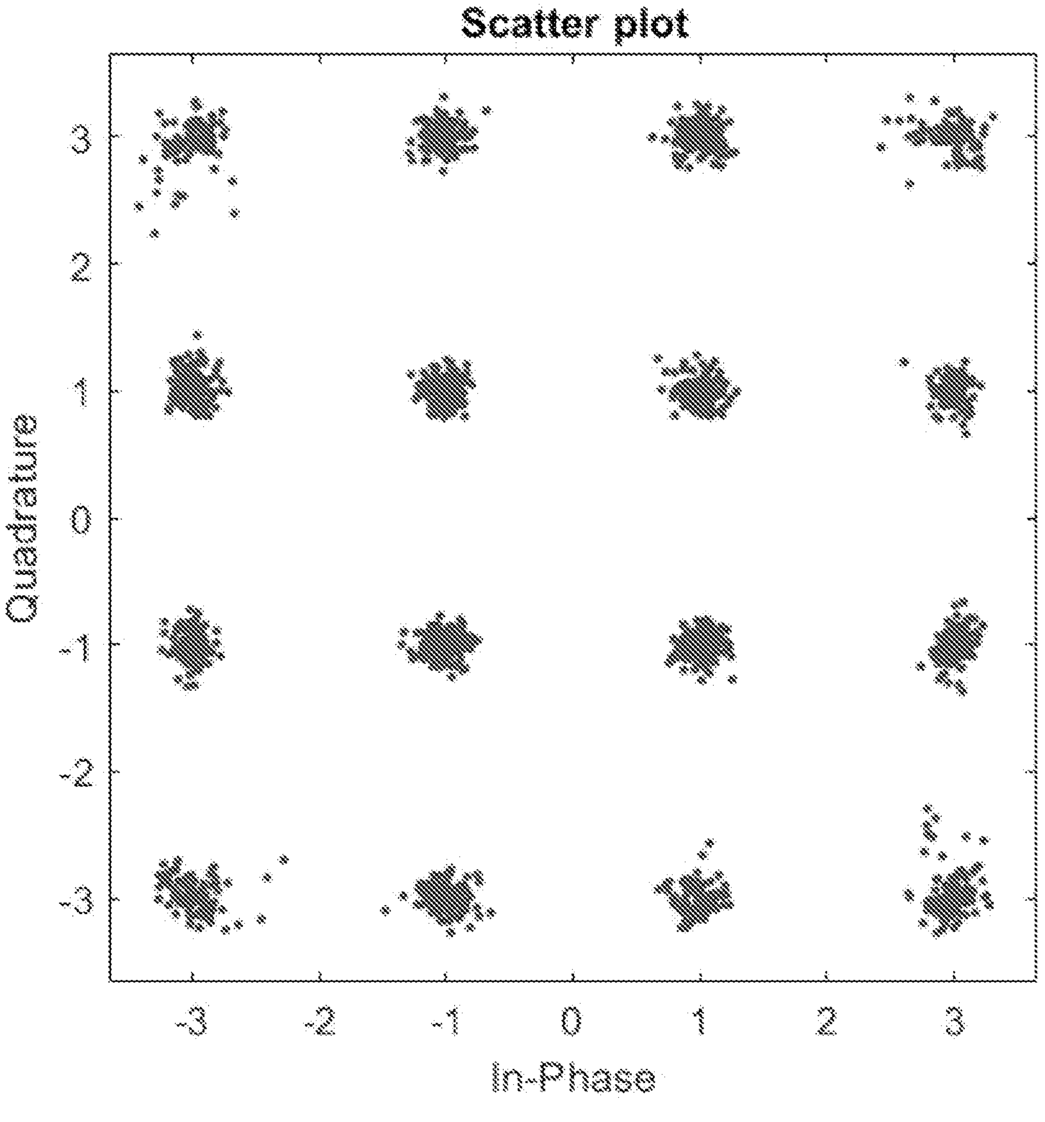
FIG. 13C shows a receiver received-signal graph, according to embodiments of the disclosure.

A single-tone blocker is injected at 1.9998 GHZ, which corresponds to a frequency offset of 100 kHz relative to the desired signal centered at 1.9999 GHz. The IF signal spectrum of the low-side injection mixer is shown in FIG. 13A). Compared to FIG. 12A), the presence of the blocker increased the noise floor by approximately 20 dB. The decoded constellation when the low-side injection path is individually processed is plotted in FIG. 13B) and corresponds to an output SINR of 15.7 dB. Although not shown, the output SINR of the high-side injection path is 12.3 dB. When the receiver is employed, the constellation is shown in FIG. 13C), which correspond to an output SINR of 25.1 dB. Compared to the low-side injection path alone, which represents the higher performance path, the receiver improved the output SINR by 9.4 dB.

IV. Conclusion

A general approach for close-in and reciprocal mixing phase noise distortion compensation is demonstrated. Despite the simplicity of the phase noise compensation approach, preliminary results suggest that the resulting performance improvements are significant.

It is understood that similarly numbered and/or named components may function in a substantially similar fashion. Redundant explanation of these components has been omitted for clarity.

Figure 14:
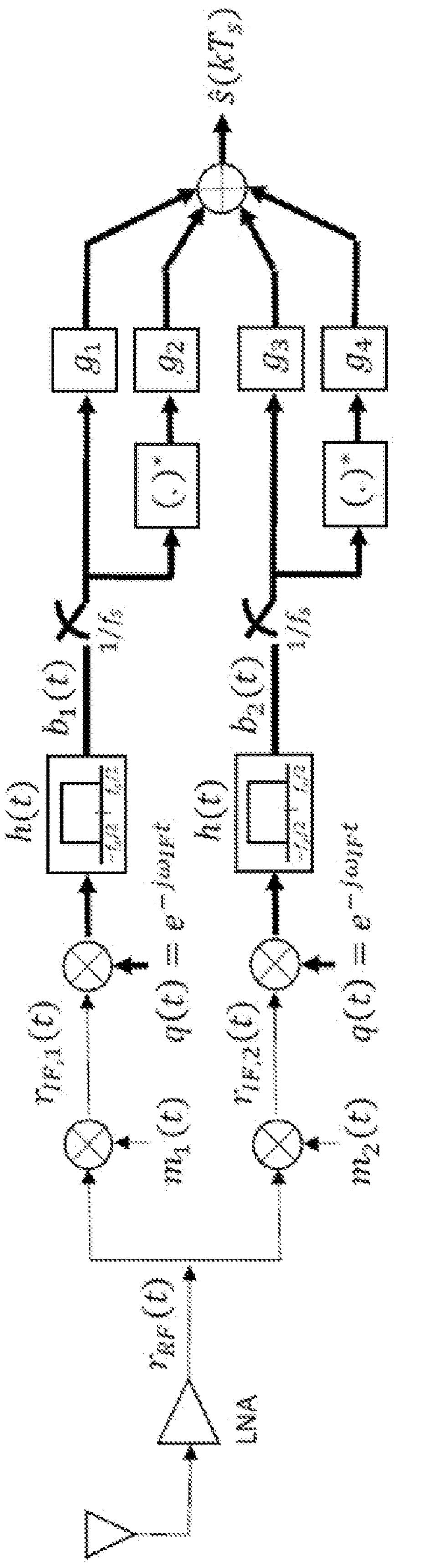
FIG. 14 shows a block diagram/schematic of a receiver, according to additional embodiments of the disclosure.

Turning to FIG. 14, another non-limiting example of a receiver for performing the signal processing discussed herein is shown. In the non-limiting example, $$m_1(t) = \cos\left((\omega_0 - \omega_{IF})t + \left(\frac{\omega_0}{\omega_{IF}} - 1\right)\theta(t)\right);$$

low-side injection IF receiver. Additionally, $$m_2(t) = \cos\left((\omega_0 + \omega_{IF})t + \left(\frac{\omega_0}{\omega_{IF}} + 1\right)\theta(t)\right);$$

high-side injection IF receiver. In the example, $\omega_0$ represents the desired frequency (in radians).

Figure 15:
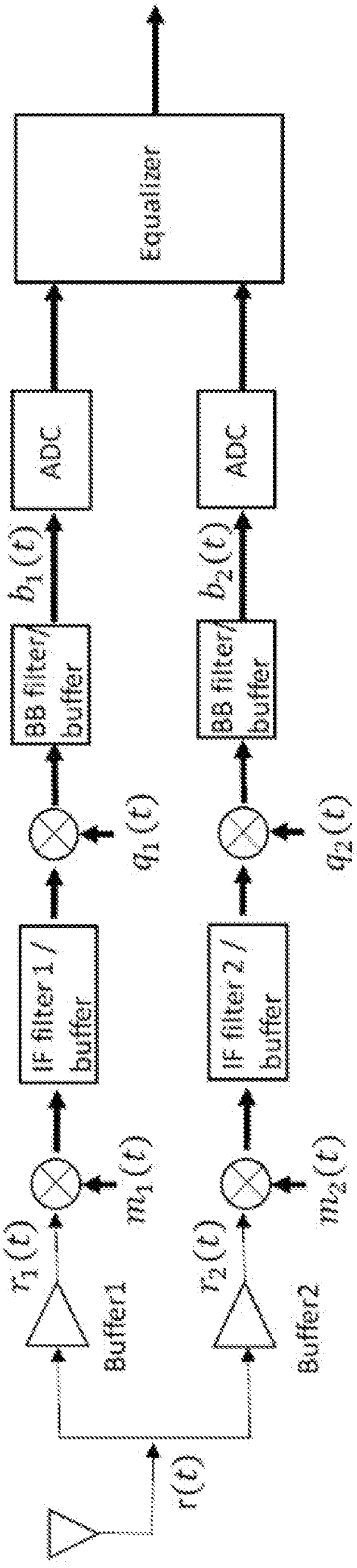
FIG. 15 shows a block diagram/schematic of a receiver, according to further embodiments of the disclosure.

FIG. 15 shows another non-limiting example of a receiver. The buffer shown in FIG. 15 may be LNA, LNTA, and/or a wire, and bold lines depicted in the non-limiting example may represent complex signals. In the non-limiting example, $m_1(t)=e^{\pm j[\omega_1 t+P_1\theta(t)]}$; $q_1$ $(t)=e^{\mp j(\omega_1-\omega_0)t}$ and $m_2(t)=e^{\pm j[w_2 t+P_2\theta(t)]}$; $q_2(t)=e^{\mp j(\omega_2-\omega_0)^t}$, where $\omega_1$ and $\omega_2$ can be any frequencies (e.g., $\omega 1=\omega_0$). Additionally in the non-limiting example, P1≠P2 and IF filter attenuates blockers →IF-to-BB LO q(t) phase noise may not be critical. Accordingly, it is seen that by making P1≠P2 the phase noise of the first local oscillator signal $m_1(t)$ and the second local oscillator signal $m_2(t)$ can scale linearly relative to one another.

Figure 16:
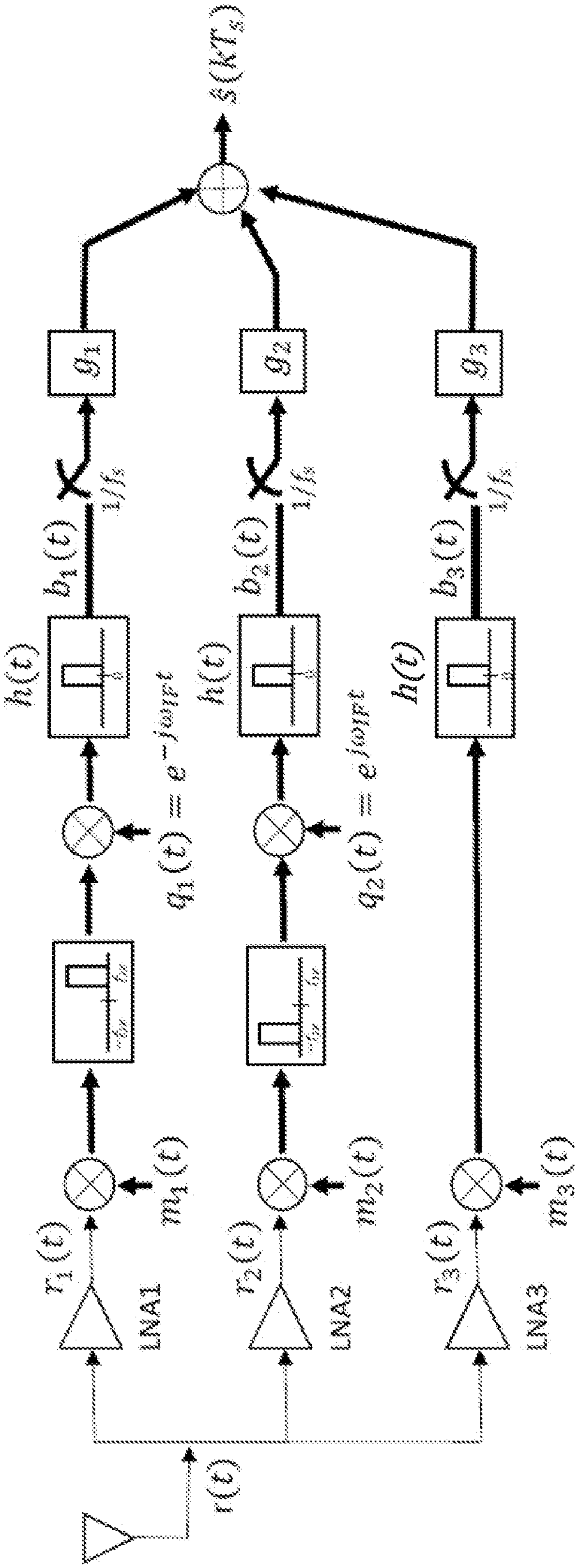
FIG. 16 shows a block diagram/schematic of a receiver, according to another embodiment of the disclosure.

FIG. 16 shows another non-limiting example of a receiver for performing the signal processing discussed herein. In the non-limiting example, $$m_1(t) = e^{-j\left[(\omega_0-\omega_{IF})t+\left(\frac{\omega_0}{\omega_{IF}}-1\right)\theta(t)\right]};$$

low-side injection IF receiver, $$m_2(t) = e^{j\left[(\omega_0+\omega_{IF})t+\left(\frac{\omega_0}{\omega_{IF}}+1\right)\theta(t)\right]};$$

high-side injection IF receiver, and $$m_3(t) = e^{-j\left[\omega_0 t+\left(\frac{\omega_0}{\omega_{IF}}\right)\theta(t)\right]};$$

direct-conversion (zero-IF) receiver. Additionally in the example, any two of three paths may be sufficient for noise compensation. As discussed herein, the phase noise in each path may be different, where the phase noise may be proportional to frequency.

Figure 17:
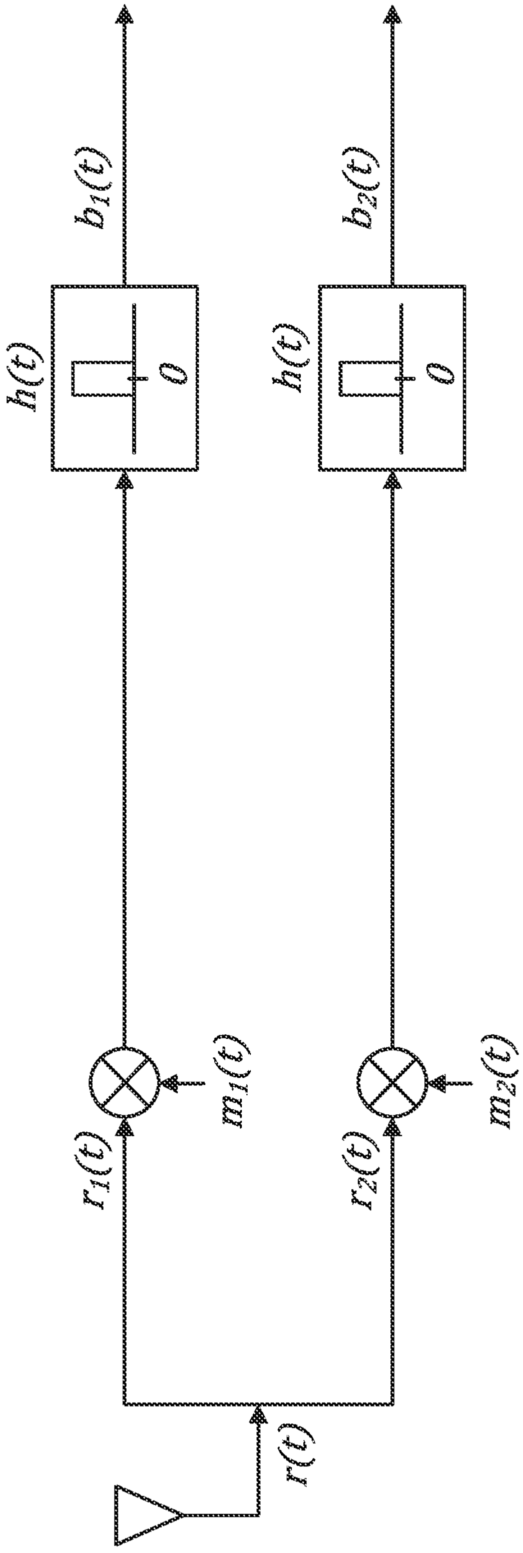
FIG. 17 shows a block diagram/schematic of a receiver, according to another embodiment of the disclosure.

FIG. 17 shows another non-limiting example of a receiver for performing the signal processing discussed herein. The receiver of FIG. 17 includes first and second receive paths in which each of the first and second receive paths is a direct conversion (zero-IF) receiver arrangement wherein a radiofrequency signal picked up from an antenna can be down-converted by the illustrated mixer directly into baseband.

In various embodiments herein phase noise of first and second local oscillator signals, $m_1(t)$ and m2(t), can be controlled to be different by configuring a receiver so that phase noise of a local oscillator signal is dependent on an operating frequency of the local oscillator signal. Embodiments herein recognize that alternative methods can be practiced so the phase noise of first and second local oscillator signals m1(t) and m2(t) produced from a common signal generator can be differentiated.

In the embodiment of the receiver of FIG. 17, wherein first and second signal paths are direct conversion receiver arrangement signal paths, phase noise between local oscillator signal m1 and local oscillator signal m2 produced from a common signal generator can be controlled to be differentiated with use of a modified frequency synthesizer to produce first and second tones at the carrier frequency $\omega_0$ with differentiated phase noise between tones. In one embodiment, one or more time amplifier can be used for amplification of phase noise to produce local oscillator signals m1(t) and m2(t) with differentiated phase noise. The phase noise of m2(t) can be linearly scaled relative to a phase noise of m1(t). In one embodiment, the first local oscillator signal m1(t) can be provided as a straight output of a signal generator tuned to the carrier frequency $\omega_0$, and the second local oscillator signal m2(t) can be provided by inputting the signal generator output into time amplifier that amplifies phase noise of the signal generator output so that phase noise of local oscillator signal m2(t) is differentiated from phase noise of local oscillator signal m2. In one embodiment, a first time amplifier can be used to amplify phase noise of a signal generator to produce local oscillator signal m1(t) at the carrier frequency $\omega_0$ and a second time amplifier can be used to amplify phase noise of a signal generator to produce local oscillator signal m2(t) at the carrier frequency $\omega_0$. having phase noise differentiated from the phase noise of m1(t). The phase noise of m2 can be linearly scaled relative to a phase noise of m1(t).

Figure 18:
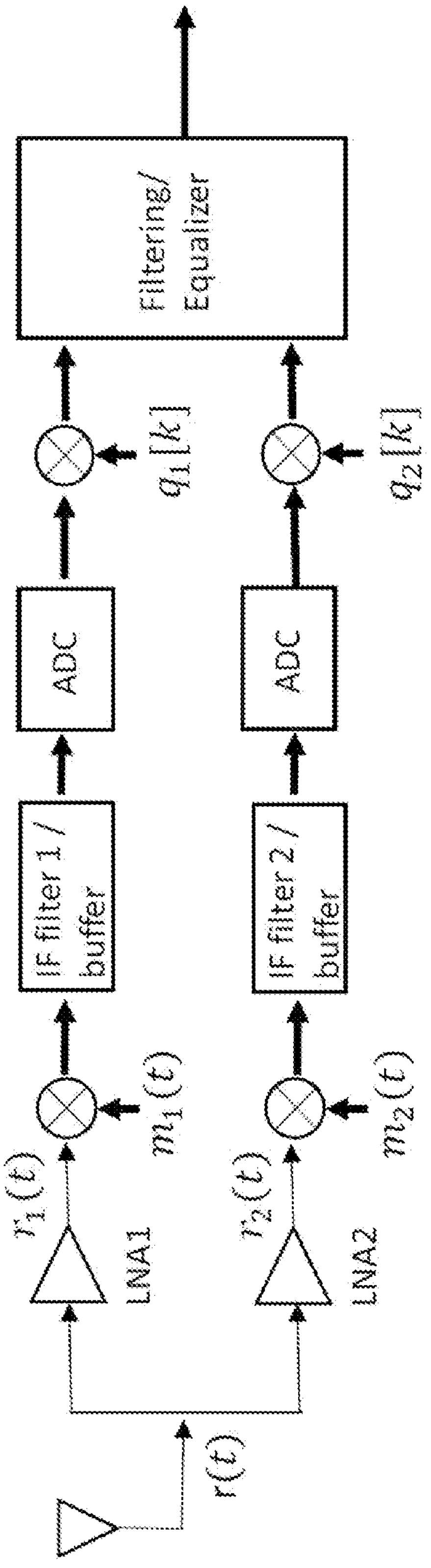
FIG. 18 shows a block diagram/schematic of a receiver, according to other embodiments of the disclosure.

FIG. 18 shows an additional non-limiting example of a receiver for performing the signal processing. In the example, output of the IF filter may be digitized for subsequent digital processing. For example, the IF-to-BB may be performed digitally. Additionally, after basic signal conditioning, equalization may be performed.

FIG. 19 another non-limiting example of a receiver for performing the signal processing discussed herein is shown. In the non-limiting example, the receiver may include a plurality of frequency multipliers, each in communication with a buffer structure of the receiver. Each of the plurality of frequency multipliers may generate a local oscillating signal. In a non-limiting example, each of the frequency multipliers may include distinct frequency multiplication characteristics. The frequency multiplication characteristics may include, but are not limited to, multiplying a reference signal by distinct factors (e.g., 2×, 3×). In the example, a reference signal may include a reference clock signal generated by a reference clock. The reference clock may be in communication with each of the plurality of frequency multipliers. As shown, the reference clock signal may be used in generating the local oscillating signals within the system. Although two frequency multipliers are shown, it is understood that the system may include as many frequency multipliers as there are mixers. The receiver of FIG. 19 can include a signal generator provided by a reference clock which can be defined by an oscillator. The receiver of FIG. 19 can include a frequency conditioning circuit for producing first and second local oscillator signals from the signal generator. The frequency conditioning circuit of FIG. 19 can include a power splitter, a first 2× frequency multiplier and a second 3× frequency multiplier. In one aspect, the components of the frequency conditioning circuit of FIG. 19 can be defined by passive components and can be absent of active components. In one embodiment, the components of the frequency conditioning circuit of FIG. 19 can consist of passive components and can be absent of active components. The configuring of the frequency conditioning circuit so that the power splitter, the first 2× frequency multiplier and a second 3× frequency multiplier are provided by passive components and are absent of active circuit components can provide control of phase noise of the first local oscillator signal m1(t) and the second local oscillator signal m2(t). The receiver with use of the frequency conditioning circuit can control the phase noise of the first local oscillator signal m1(t) and the second local oscillator signal m2(t) to scale linearly with respect to one another so that a system of equations as set forth in reference to (12)-(16) can be solvable. As depicted in FIG. 19, the outputs from the frequency conditioning circuit can be input into first and second respective signal buffers, which can be provided by low noise amplifiers, and outputs from the buffers can be input into the described first and second mixers.

In various embodiments herein phase noise of first and second local oscillator signals, m1 and m2, can be controlled to be different by configuring a receiver so that phase noise of a local oscillator signal is dependent on an operating frequency of the local oscillator signal. Embodiments herein recognize that alternative methods can be practiced, e.g., with use of time amplification, so the phase noise of first and second local oscillator signals m1(t) and m2(t) produced from a common signal generator can be differentiated. In one embodiment, first and second local oscillator signals m1(t) and m2(t) produced from a common signal generator can be controlled so that phase noise of first and second local oscillator signals m1(t) and m2(t) are scaled linearly with respect to one another.

In various embodiments herein, phase noise of first local oscillator signal and a second local oscillator signal can be differentiated by the scaling factors M−1 and M+1. For example, in reference to (10) and (11) phase noise can be scaled linearly with frequency, i.e., the phase noise of the tone at frequency (M−1) fIF is (M−1)θ(t) while the tone at (M+1) fIF is (M+1)θ(t). In the embodiment of FIG. 10, the general case is shown wherein a first local oscillator signal m1(t) has the phase noise P1θ(t) and the second local oscillator signal m2(t) has the phase noise P2θ(t), and wherein P1≠P2 so that phase noise of the first local oscillator signal m1(t) and the phase noise of the second local oscillator signal are linearly scaled relative to one another.

With the local oscillator phase noise scaling factors generalized to P1 and P2, the matrix equation for the system of equations set forth in (12) and (13) can be organized as the matrix equation (16)

$$\underbrace{\begin{bmatrix} b_1(t) \\ b_2(t) \end{bmatrix}}_{b(t)} = \underbrace{\begin{bmatrix} e^{-j\emptyset 1} & -je^{-j\emptyset 1}(P1) \\ e^{-j\emptyset 2} & -je^{-j\emptyset 2}(P2) \end{bmatrix}}_{A} \underbrace{\begin{bmatrix} s(t) \\ v(t) \end{bmatrix}}_{x(t)} + \underbrace{\begin{bmatrix} n_1(t) \\ n_2(t) \end{bmatrix}}_{n(t)} \tag{16}$$

Embodiments herein recognize that the desired signal s(t) can be isolated and decoupled from distortion by use a solution to a system of equations solvable for s(t) as set forth in (12)-(14), (16) wherein the system of equations can include a first equation, e.g., (12) that expresses a first observed signal $b_1(t)$ as a function of the desired signal s(t) within the radiofrequency signal and distortion of the radiofrequency signal attributable to signal generator phase noise, and a second equation (13) that expresses a second observed signal $b_1(t)$ as a function of the desired signal s(t) within the radiofrequency signal and distortion of the radiofrequency signal attributable to signal generator phase noise.

Matrix A of (16) can include a first column having the terms $e^{-j\phi 1}$ and $e^{-j\phi 2}$ and a second column having the terms $-je^{-j\phi 1}$(P1) and $-je^{-j\phi 2}$(P2). Each of the columns of matrix A can be linearly independent of one another, meaning that matrix A can be regarded to be full column rank.

In the matrix equation (14) and (16), s(t) multiplies with the first column of matrix A and v(t) multiplies with the second column of matrix A. The vector subspace spanned by s(t) is defined by the first column of A, and the vector subspace spanned by x(t) is defined by the second column of A. In one aspect the vector subspace spanned by s(t) can be independent of the vector subspace spanned by v(t). Accordingly, the desired signal s(t) spans a different vector subspace than the subspace spanned by reciprocal mixing and close-in phase noise distortion v(t).

In one aspect of providing a system of equations that is solvable, matrix A can include first and second columns that are independent of one another. In another aspect of providing a system of equations that is solvable, matrix A can be a full column rank matrix. In another aspect of providing a system of equations that is solvable, matrix A can be a non-degenerate matrix. In another aspect of providing a system of equations that is solvable, matrix A can include first and second columns that are independent of one another that are multiplied by a vector including the desired signal s(t) and a distortion term v(t). In another aspect of providing a system of equations that is solvable, matrix A can be a full column rank matrix that includes first and second columns multiplied by a vector including the desired signal s(t) and a distortion term v(t). In another aspect of providing a system of equations that is solvable, a desired signal s(t) spans a different vector subspace than the subspace spanned by reciprocal mixing and close-in phase noise distortion v(t). In another aspect of providing a system of equations that is solvable, a desired signal s(t) spans a different vector subspace than the vector subspace spanned by distortion term v(t).

Matrix A can be regarded as a noise scaling matrix that represents the scaling of distortion v(t) in observed signals by phase noise of local oscillator signals.

Referring to (12)-(14), (16), it can be seen that columns of matrix A can be independent to define a column full rank matrix where the phase noise scaling factors P1 and P2 (expressed as M−1, M+1 in a particular example) are linearly scaled relative to one another. Further, where the phase noise scaling factors P1 and P2 (expressed as M−1, M+1 in the particular example of (12)-(14)) are linearly scaled relative to one another, the vector subspace spanned by the desired signal s(t) and the distortion term v(t) can be independent of one another.

Accordingly, referring to (12)-(14), (16) in one embodiment, the system of equations defined by (12)-(14), (16) can be made solvable to isolate and decouple the desired signal s(t) from distortion by configuring and controlling local oscillator signals m1(t) and m2(t) so that phase noise of the local oscillator signal m1(t) and the phase noise of the local oscillator signal m2(t) scale linearly relative to one another. Embodiments herein recognize that the system of equations (12)-(14), (16) can be solvable for the desired signal s(t) even where the phase noise scaling factors P1 and P2 are unknown.

Accordingly, in reference to a receiver configured according to (12)-(16) there is set forth herein, e.g., a receiver that comprises a first mixer disposed in a first signal path, wherein the first mixer performs mixing of a radiofrequency signal with a first local oscillator signal to provide a first downconverted signal, the first local oscillator signal produced using a signal generator, wherein the radiofrequency signal includes a desired signal; a second mixer disposed in a second signal path, wherein the second mixer performs mixing of the radiofrequency signal with a second local oscillator signal to provide a second downconverted signal, the second local oscillator signal produced using the signal generator; wherein receiver is configured for performing processing of a first observed signal from the first signal path and a second observed signal from the second signal path to extract the desired signal, wherein the first observed signal is produced in dependence on the mixing by the first mixer and wherein the second observed signal is produced in dependence on the mixing by the second mixer. There is also set forth herein, in reference to a receiver configured according to (12)-(16), e.g., the receiver wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another. There is also set forth herein, in reference to a receiver configured according to (12)-(16), e.g., the receiver wherein the performing processing includes using a solution to a system of equations to extract the desired signal in the presence of phase noise induced distortion, wherein the receiver is configured to control the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. In one example, control of a first local oscillator signal and a second local oscillator signal can include control so that phase noise of the second local oscillator signal attributable to phase noise of a signal generator is linearly scaled relative to phase noise of the first local oscillator signal attributable to phase noise of the signal generator.

There is also set forth herein, in reference to a receiver configured according to (12)-(16), e.g., a method comprising mixing a radiofrequency signal with a first local oscillator signal in a first signal path to provide a first downconverted signal, the first local oscillator signal produced using a signal generator, wherein the radiofrequency signal includes a desired signal; mixing the radiofrequency signal with a second local oscillator signal in a second signal path to provide a second downconverted signal, the second local oscillator signal produced using the signal generator; and performing processing of a first observed signal from the first signal path and a second observed signal from the second signal path to extract the desired signal, wherein the first observed signal is produced in dependence on the mixing of the radiofrequency signal with the first local oscillator signal and wherein the second observed signal is produced in dependence on the mixing of the radiofrequency signal with the second local oscillator signal. There is also set forth herein, in reference to a receiver configured according to (12)-(16), e.g., the method, wherein the performing processing includes using a solution to a system of equations to extract the desired signal in the presence of phase noise induced distortion, wherein method includes controlling the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. In one example, controlling of a first local oscillator signal and a second local oscillator signal can include performing controlling so that phase noise of the second local oscillator signal attributable to phase noise of a signal generator is linearly scaled relative to phase noise of the first local oscillator signal attributable to phase noise of the signal generator. There is also set forth herein, in reference to a receiver configured according to (12)-(16), e.g., the method wherein the method includes controlling phase noise of the first local oscillator signal attributable to phase noise of the signal generator and phase noise of the second local oscillator signal attributable to phase noise of the signal generator to be linearly scaled relative to one another.

The illustrative frequency conditioning circuit of FIGS. 11B and 19 processing an output from a signal generator can include a power splitter, a first 2× frequency multiplier and a second 3× frequency multiplier. The components of the frequency conditioning circuit of FIG. 11B and FIG. 19 external to the signal generator, including the power splitter, the 2× frequency multiplier and the 3× frequency multiplier can be defined by passive circuit components and can be absent of active components. In one embodiment, the components of the frequency conditioning circuit of FIG. 11B and FIG. 19 can consist of passive circuitry components and can be absent of active circuitry components. The configuring of the frequency conditioning circuit so that the power splitter, the first 2× frequency multiplier and a second 3× frequency multiplier are provided by passive components and are absent of active circuit components can assure that phase noise of the first local oscillator signal m1(t) and the second local oscillator signal m2(t) scale linearly with respect to one another so that a system of equations as set forth in reference to (12)-(16) can be solvable. As depicted in FIG. 11B and FIG. 19, the outputs from the frequency conditioning circuit can be input into first and second respective signal buffers, which can be provided by low noise amplifiers, and outputs from the buffers can be input into the described first and second mixers.

Embodiments of receivers herein can include first and second signal paths for processing of a radiofrequency signal picked up from an antenna. Embodiments herein recognize, e.g., as set forth with reference to FIG. 16 that a receiver herein can include one or more additional signal path in addition to first and second signal paths. With additional signal paths, additional rows can be added to a solvable system of equations expressible as matrix as shown in (14) and (16) for solving by a solver. A receiver having more than two paths can define an overdetermined system. In some embodiments, receivers herein can include first and second radiofrequency signal paths that include mixers that downconvert the radiofrequency signal to an intermediate frequency. In some embodiments, as shown by the receiver of FIG. 16 a first signal path can include a mixer (the top or middle paths, with local oscillator signals m1(t) and m2(t)

respectively) that downconverts to an intermediate frequency (IF), and a second signal path can include a mixer (with local oscillator signal m3(t)) that downconverts to baseband. In some embodiments, as shown in FIG. 17 first and second signal paths can include respective mixers that downconvert to baseband. Embodiments herein, e.g., as described with reference to (12)-(16) and FIGS. 14-19 can feature observed signals provided by baseband signals bn(t). Processing herein can include use of a solution to a system of equations expressible in the matrix as shown in (14) and (16) in which first to Nth equations comprise an observed signal provided by a baseband signal expressed as a function of a desired signal within a radiofrequency signal and distortion of the radiofrequency signal attributable to phase noise. In some embodiments, processing herein can include use of a solution to a system of equations expressible in the matrix as shown in (14) and (16) in which one or more of first to Nth equations comprise an observed signal provided by an intermediate frequency (IF) signal expressed as a function of a desired signal within a radiofrequency signal and distortion of the radiofrequency signal attributable to phase noise.

Embodiments herein recognize that attributes of the matrices depicted in (14) and (16) can facilitate solving to extrapolate s(t) using a straightforward linear equalizer, e.g., a minimum mean squared (MMSE) solver, or a forced zero forcing (ZF) solver. Processing performed by a linear equalizer can include simple weighting and summing of observed signals, and/or their conjugates, as is indicated by the simple weighting and summing functions in the receivers depicted in FIG. 14 and FIG. 16.

Embodiments of a receiver herein can include buffers e.g., low noise amplifiers (LNAs). Buffers can be useful in applications wherein an incoming radiofrequency signal can be weak. The radiofrequency signal can be amplified so that noise introduced by the depicted mixers can be appropriately reduces in significance according to design criterion. A buffer can be disposed after an antenna but before a splitter into multiple signal paths, as depicted in FIG. 14. In one embodiment, respective buffers can be disposed in respective signal paths prior to a mixer as depicted in FIG. 15. The embodiment of FIG. 15, wherein respective buffers are disposed in respective signal paths can be useful for isolation between the signal paths.

Embodiments herein can include a compensation scheme in which a receiver front-end can be configured with additional degrees of freedom so that a desired signal can be readily decoupled from the distortion caused by close-in phase noise and reciprocal mixing. Phase noise induced distortion, wherein close-in phase noise distortion or reciprocal mixing phase noise distortion, can be simply suppressed while leaving the desired signal intact. Referring to embodiments herein, (1) refers to the received RF signal at the antenna that has not yet been distorted by the receiver LO phase noise. LO phase noise described herein can be introduced subsequently in the receiver signal path as the received RF signal is downconverted to a lower frequency.

In one aspect, first and second local oscillator signals can be produced from a common signal generator which can be provided by an oscillator. In one example, a common signal generator provided by a single oscillator can drive first and second different frequency multipliers to produce different frequencies with phase noise that are related to each other. The local oscillator signals can have constant amplitude over time. The respective operating frequencies of the first and second local oscillator signals, m1(t) and m2(t) can be related to a desired signal carrier frequency and receiver IF frequency (in the case of a super-heterodyne receiver path). If the carrier frequency is M times the IF frequency, where M is a positive integer greater than 1, then m1(t) and m2(t) can be at (M−1) and (M+1) times the IF frequency, according to one example. The selection of M, in the described example, can be a tradeoff between implementation complexity and phase noise compensation performance.

Embodiments herein recognize that increasing an operating frequency spacing between local oscillator signals of first and second radiofrequency signal paths can facilitate noise suppression in various use cases even if the circuit noise subsequent to the mixer is significant. Embodiments herein recognize that narrowly spaced first and second local oscillator signals, while advantageous in some use cases, can place higher implementation challenges in the signal path circuitries following the local oscillator signal, because the difference in phase noise distortion between the two paths becomes small. In one embodiment, first and second local oscillator signals m1(t) and m2(t) can have an operating frequency spacing of 100 MHz or more. In one embodiment, first and second local oscillator signals m1(t) and m2(t) can have an operating frequency spacing of 200 MHz or more. In one embodiment, first and second local oscillator signals m1(t) and m2(t) can have an operating frequency spacing of 300 MHz or more. In one embodiment, first and second local oscillator signals m1(t) and m2(t) can have an operating frequency spacing of 400 MHz or more. In one embodiment, first and second local oscillator signals m1(t) and m2(t) can have an operating frequency spacing of 500 MHz or more. In one embodiment, first and second local oscillator signals m1(t) and m2(t) can have an operating frequency spacing of 600 MHz or more. In one embodiment, first and second local oscillator signals m1(t) and m2(t) can have an operating frequency spacing of 500 MHz or more. In one embodiment, first and second local oscillator signals m1(t) and m2(t) can have an operating frequency spacing of 700 MHz or more. In one embodiment, first and second local oscillator signals m1(t) and m2(t) can have an operating frequency spacing of 800 MHz or more. In one embodiment, first and second local oscillator signals m1(t) and m2(t) can have an operating frequency spacing of 600 MHz or more.

In one aspect, as set forth in reference to (1)-(16) and FIGS. 14-19, a first radiofrequency signal path having a first mixer and a second radiofrequency signal path having a second mixer can be configured for extraction of a common desired signal, namely s(t).

In one aspect, the phase noise of at least one of first or second local oscillator signals for input into a mixer of respective first and second radiofrequency signal paths can be a multiple (not necessarily integer) of θ(t). In one aspect, the phase noise of a first local oscillator signal for input into a mixer of a first radiofrequency signal path can be a first multiple (not necessarily integer) of θ(t), and the phase noise of a first local oscillator signal for input into a mixer of a first radiofrequency signal path can be a second multiple (not necessarily integer) of θ(t), so that the phase noise of the first local oscillator signal and the phase noise of the second local oscillator signal are linearly scaled relative to one another. To maintain a targeted phase noise relationship according to one example, first and second local oscillator signals can be produced and generated from a common signal generator provided by an oscillator, and the first and second local oscillator signals can be generated using an appropriately configured frequency conditioning circuit.

According to one embodiment, by observing first and second differently distorted radio frequency signals having the desired signal, the distortion effect can be subsequently suppressed. Embodiments herein facilitate the providing of systems of equations expressible as matrices, e.g., as described in connection with (12)-(16) that are solvable to extraction of a desired signal s(t).

Embodiments herein can provide a system of equations solvable for s(t) to facilitate suppression of both close-in phase noise distortion and reciprocal phase noise distortion which is the spreading of an interferer spectrum by local oscillator phase noise to the desired signal band. Embodiments herein recognize that, as explained in connection with (12) and (13), that gain coefficients of $v_s(t)$ and $v_I(t)$ in (12) (as well as their conjugates $v_s^*(t)$ and $v^*(t)$ in (13)) are the same, suggesting that the desired signal distortion from close-in phase noise and reciprocal mixing are indistinguishable and can be combined as a single noise source.

Embodiments herein recognize that since phase noise distortion is the result of phase noise multiplied by a signal, it can be regarded as irrelevant whether the signal is the desired signal (as in close-in noise) or an out-of-band interferer. As far as phase noise distortion is concerned, in one aspect, the desired signal can be viewed as an interferer that is situated in-band. Processing of a downconverted signal for extraction of a desired signal s(t) can be performed entirely with analog circuitry, entirely with digital circuitry after conversion to the digital domain, or with a combination of analog and digital circuitry.

A small sample of combinations set forth herein include the following.

A1. A signal processing receiver system for suppressing close-in phase noise and suppressing reciprocal mixing noise, the signal processing receiver system comprising: a first receive path of a plurality of receive paths receiving an input signal, the first receive path including: a first radio-frequency (RF)-buffer structure buffering the received, input signal to form a first buffered input signal, a first radio frequency (RF)-to-intermediate frequency (IF) mixing structure operatively coupled to the first RF-buffer structure, the first RF-to-IF mixing structure: receiving the first buffered input signal, receiving a first local oscillating signal including: a first operating frequency, a first phase offset, and a first phase noise, and downconverting the first buffered input signal to generate a first intermediate frequency signal; and a first IF-buffer structure operatively coupled to the first RF-to-IF mixing structure, the first IF-buffer receiving the generated, first intermediate frequency signal from the first RF-to-IF mixing structure to form a first, buffered intermediate frequency signal; a second receive path of the plurality of receive paths, the second receive path distinct from the first receive path and including: a second RF-buffer structure buffering the received, input signal to form a second buffered input signal, a second RF-to-IF mixing structure operatively coupled to the second RF-buffer structure, the first RF-to-IF mixing structure: receiving the second buffered input signal, receiving a second local oscillating signal, distinct from the first local oscillating signal, the second local oscillating signal including: a second operating frequency, a second phase offset, and a second phase noise scaled linearly with respect to the first phase noise, and downconverting the second buffered input signal and to generate a second intermediate frequency signal; and a second IF-buffer structure operatively coupled to the second RF-to-IF mixing structure, the second IF-buffer receiving the generated, second intermediate frequency signal from the second RF-to-IF mixing structure to form a second, buffered intermediate frequency signal. A2. The system of A1, wherein each of the first RF-buffer structure in the first receive path and the second RF-buffer structure in the second receive path include at least one of: a low-noise amplifier, a low-noise-transconductance amplifier, or a wire for receiving the input signal. A3. The system of A1, wherein the first RF-buffer structure in the first receive path includes: an upstream RF buffer receiving the input signal and generating an intermediate buffered input signal, and a downstream RF buffer operatively coupled to the upstream RF buffer, the downstream RF buffer receiving and buffering the intermediate buffered input signal to generate the first buffered input signal. A4. The system of A3, wherein the second RF-buffer structure in the second receive path includes: an upstream RF buffer receiving the input signal and generating an intermediate buffered input signal, and a downstream RF buffer operatively coupled to the upstream RF buffer, the downstream RF buffer receiving and buffering the intermediate buffered input signal to generate the second buffered input signal. A5. The system of A1, further comprising: an upstream RF buffer receiving the input signal and generating an intermediate buffered input signal, the upstream RF buffer operatively coupled with each of the first RF buffer of the first receive path and the second RF buffer of the second receive path. A6. The system of A5, wherein: the first RF buffer of the first receive path receives the intermediate buffer input signal and forms the first buffered input signal, and the second RF buffer of the second receive path receives the intermediate buffer input signal and forms the second buffered input signal. A7. The system of A1, wherein the RF-to-IF mixing structure in the receive path in the plurality of receive paths include high-side injection IF mixing, low-side injection IF mixing, a joint low-side and high-side injection IF mixing, zero-IF mixing, or subharmonic mixing. A8. The system of A1, wherein: the first operating frequency of the first oscillating signal includes at least two operating frequency tones, and the first phase noise of the first oscillating signal includes at least two first phase noises, each of the at least two first phase noises corresponding to each of the at least two operating frequency tones and scaled linearly with respect to one another. A9. The system of A8, wherein the first buffered input signal is downconverted by the first RF-to-IF mixing structure to generate at least two distinct, first intermediate frequency signals. A10. The system of A1, wherein: the first RF-to-IF mixing structure and the first IF-buffer structure in the first receive path employ image rejection techniques when mixing the first buffered input signal and the first local oscillating signal to generate the first intermediate frequency signal, and the second RF-to-IF mixing structure and the second IF-buffer structure in the second receive path employs image rejection techniques when mixing the second buffered input signal and the second local oscillating signal to generate the second intermediate frequency signal. A11. The system of A10, wherein the image rejection techniques include: performing a quadrature downconversion of the first buffered input signal to generate the first intermediate frequency signal using the first RF-to-IF mixing structure, and performing a distinct quadrature downconversion of the second buffered input signal to generate the second intermediate frequency signal using the second RF-to-IF mixing structure. A12. The system of A1, wherein the first local oscillating signal and the second local oscillating signal are generated by a single-sideband or double-sideband mixing of a frequency divided original oscillating signal with an original oscillating signal or a phase-shifted original oscillating signal. A13. The system of A1, wherein the first local oscillating signal and the second local oscillating signal are generated by modulating a code sequence using an original oscillating signal, wherein the code sequence includes a real component and an imaginary component, each of the real component and the imaginary component consisting of values 1, 0, or −1, and wherein the original oscillating signal include an in-phase component and a quadrature-phase component. A14. The system of A13, wherein the modulating of the code sequence includes: summing: a difference between: a product of the real component of the code sequence and the in-phase component of the original oscillating signal, and a product of the imaginary component of the code sequence and the quadrature-phase component of the original oscillating signal, and a sum of: a product of the real component of the code sequence and the quadrature-phase component of the original oscillating signal, and a product of the imaginary component of the code sequence and the in-phase component of the original oscillating signal. A15. The system of A14, wherein each of the first generated intermediate frequency signal and the second generated intermediate frequency signal include: a real intermediate frequency component and an imaginary intermediate frequency component. A16. The system of A1, wherein the first IF-buffer structure and the second IF-buffer structure are formed as a bandpass filter or a lowpass filter. A17. The system of A16, wherein the bandpass filter is a complex bandpass filter. A18. The system of A1, further comprising: a plurality of IF-to-baseband (BB) mixers including: a first IF-to-BB mixer operatively coupled with the first IF-buffer structure, the first IF-to-BB mixer multiplying the first, buffered intermediate frequency signal to form a first complex baseband signal, and a second IF-to-BB mixer operatively coupled with the second IF-buffer structure, the second IF-to-BB mixer multiplying the second, buffered intermediate frequency signal to form a second complex baseband signal; a plurality of baseband filters including: a first baseband filter operatively coupled with the first IF-to-BB mixer, the first baseband filter filtering the first complex baseband signal to form a first, filtered baseband signal, and a second baseband filter operatively coupled with the second IF-to-BB mixer, the second baseband filter filtering the second complex baseband signal to form a second, filtered baseband signal; and an equalizer in operatively coupled with each of the plurality of baseband filters, the equalizer: multiplying the first, filtered baseband signal with a first weight to get a first calculated product, multiplying the second, filtered baseband signal with a second weight to get a second calculated product, and summing the first calculated product and the second calculated product to estimate a desired signal, the desired signal including: suppressed close-in phase noise, and suppressed reciprocal mixing noise. A19. The system of A18, further comprising a plurality of analog-to-digital converters (ADCs) including: a first set of ADCs positioned upstream of the equalizer, the first set of ADCs operatively coupled with the first baseband filter of the plurality of baseband filters to digitize the first, filtered baseband signal, and a second set of ADCs positioned upstream of the equalizer, the second set of ADCs operatively coupled with the second baseband filter of the plurality of baseband filters to digitize the second, filtered baseband signal. A20. The system of A18, further comprising a plurality of analog-to-digital converters (ADCs) including: a first set of ADCs positioned upstream of and operatively coupled to first IF-to-BB mixer, the first set of ADCs digitizing the first, buffered intermediate frequency signal, and a second set of ADCs positioned upstream of and operatively coupled to second IF-to-BB mixer, the second set of ADCs digitizing the second, buffered intermediate frequency signal. A21. The system of A18, further comprising: at least one analog-to-digital converter (ADC) positioned downstream of and operatively coupled to the equalizer, the at least one ADC digitizing the desired signal. A22. The system of A1, wherein: the first local oscillating signal is generated using a first frequency multiplier having first frequency multiplication characteristics; and the second local oscillating signal is generated using a second frequency multiplier having second frequency multiplication characteristics, the second frequency multiplication characteristics of the second frequency multiplier distinct from the first frequency multiplication characteristics of the first frequency multiplier. A23. The system of A22, wherein the first frequency multiplication characteristics of the first frequency multiplier includes multiplying by a first factor, and the second frequency multiplication characteristics of the second frequency multiplier includes multiplying by a second factor, distinct form the first factor. A24. The system of A22, further comprising a reference clock in communication with each of the first frequency multiplier and the second frequency multiplier, the reference clock providing a reference clock signal to each of the first frequency multiplier and the second frequency multiplier used to generate the first local oscillating signal and the second local oscillating signal, respectively.

A small sample of combinations set forth herein include the following.

B1. A method for suppressing close-in phase noise and suppressing reciprocal mixing noise, the method comprising: receiving an input signal on a first receive path of a plurality of receive paths; buffering the received, input signal to form a first buffered input signal; receiving the first buffered input signal, receiving a first local oscillating signal including: a first operating frequency, a first phase offset, and a first phase noise, and downconverting the first buffered input signal to generate a first intermediate frequency signal; and receiving the generated, first intermediate frequency signal; forming a first, buffered intermediate frequency signal; receiving the input signal on a second receive path of a plurality of receive paths, the second receive path distinct from the first receive path; buffering the received, input signal to form a second buffered input signal; receiving the second buffered input signal, receiving a second local oscillating signal, distinct from the first local oscillating signal, the second local oscillating signal including: a second operating frequency, a second phase offset, and a second phase noise scaled linearly with respect to the first phase noise, and downconverting the second buffered input signal to generate a second intermediate frequency signal; and receiving the generated, second intermediate frequency signal; and forming a second, buffered intermediate frequency signal. B2. The method of B1, wherein buffering input signal to form the first buffered input signal includes: generating a first intermediate buffered input signal, and receiving and buffering the first intermediate buffered input signal to generate the first buffered input signal. B3. The method of B2, wherein buffering input signal to form the second buffered input signal includes: generating a second intermediate buffered input signal, and receiving and buffering the second intermediate buffered input signal to generate the second buffered input signal. B4. The method of B1, further comprising: receiving the input signal; generating an intermediate buffered input signal; providing each of the first receive path and the second receive path with the generated intermediate buffer input signal in place of the input signal. B5. The method of B1, wherein: the first operating frequency of the first oscillating signal includes at least two operating frequency tones, and the first phase noise of the first oscillating signal includes at least two first phase noises, each of the at least two first phase noises corresponding to each of the at least two operating frequency tones and scaled linearly with respect to one another. B6. The method of B5, the downconverting of the first buffered input signal further includes: generating at least two distinct, first intermediate frequency signals. B7. The method of B1, further comprising: employing image rejection techniques when mixing the first buffered input signal and the first local oscillating signal to generate the first intermediate frequency signal; and employing image rejection techniques when mixing the second buffered input signal and the second local oscillating signal to generate the second intermediate frequency signal. B8. The method of B7, wherein the employing of the image rejection techniques include: performing a quadrature downconversion of the first buffered input signal to generate the first intermediate frequency signal, and performing a distinct quadrature downconversion of the second RF buffer output signal to generate the second intermediate frequency signal. B9. The method of B1, wherein the first local oscillating signal and the second local oscillating signal are generated by modulating a code sequence using an original oscillating signal, wherein the code sequence includes a real component and an imaginary component, each of the real component and the imaginary component consisting of values 1, 0, or −1, and wherein the original oscillating signal include an in-phase component and a quadrature-phase component. B10. The method of B9, wherein the modulating of the code sequence includes: summing: a difference between: a product of the real component of the code sequence and the in-phase component of the original oscillating signal, and a product of the imaginary component of the code sequence and the quadrature-phase component of the original oscillating signal, and a sum of: a product of the real component of the code sequence and the quadrature-phase component of the original oscillating signal, and a product of the imaginary component of the code sequence and the in-phase component of the original oscillating signal. B11. The method of B10, wherein each of the first generated intermediate frequency signal and the second generated intermediate frequency signal include: a real intermediate frequency component and an imaginary intermediate frequency component. B12. The method of B1, further comprising: multiplying the first, buffered intermediate frequency signal to form a first complex baseband signal; multiplying the second, buffered intermediate frequency signal to form a second complex baseband signal; filtering the first complex baseband signal to form a first, filtered baseband signal; filtering the second complex baseband signal to form a second, filtered baseband signal; and equalizing the first, filtered baseband signal and the second, filtered baseband signal by: multiplying the first, filtered baseband signal with a first weight to get a first calculated product, multiplying the second, filtered baseband signal with a second weight to get a second calculated product, and summing the first calculated product and the second calculated product to estimate a desired signal, the desired signal including: suppressed close-in phase noise, and suppressed reciprocal mixing noise. B13. The method of B12, further comprising: digitizing the first, filtered baseband signal; and digitizing the second, filtered baseband signal. B14. The method of B12, further comprising: digitizing the first, buffered intermediate frequency signal; and digitizing the second, buffered intermediate frequency signal. B15. The method of B12, further comprising digitizing the desired signal. B16. The method of B1, further comprising: generated the first local oscillating signal using a first frequency multiplier having first frequency multiplication characteristics; and generating the second local oscillating signal using a second frequency multiplier having second frequency multiplication characteristics, the second frequency multiplication characteristics of the second frequency multiplier distinct from the first frequency multiplication characteristics of the first frequency multiplier. B17. The method of B16, wherein the first frequency multiplication characteristics of the first frequency multiplier includes a first factor, and the second frequency multiplication characteristics of the second frequency multiplier includes a second factor, distinct form the first factor. B18. The method of B17, wherein generating the first local oscillating signal includes: multiplying a reference clock signal by the first factor at the first the first frequency multiplier, the reference clock signal provided by a reference clock in communication with the first frequency multiplier. B19. The method of B18, wherein generating the second local oscillating signal includes: multiplying the reference clock signal by the second factor at the second the first frequency multiplier, the reference clock signal provided by the reference clock in communication with the second frequency multiplier.

A small sample of combinations set forth herein include the following.

C1. A receiver comprising: a first mixer disposed in a first signal path, wherein the first mixer performs mixing of a radiofrequency signal with a first local oscillator signal to provide a first downconverted signal, the first local oscillator signal produced using a signal generator, wherein the radiofrequency signal includes a desired signal; a second mixer disposed in a second signal path, wherein the second mixer performs mixing of the radiofrequency signal with a second local oscillator signal to provide a second downconverted signal, the second local oscillator signal produced using the signal generator; wherein receiver is configured for performing processing of a first observed signal from the first signal path and a second observed signal from the second signal path to extract the desired signal, wherein the first observed signal is produced in dependence on the mixing by the first mixer and wherein the second observed signal is produced in dependence on the mixing by the second mixer. C2. The receiver of C1, wherein the receiver is configured so that phase noise of the first local oscillator signal attributable to phase noise of the signal generator and phase noise of the second local oscillator signal attributable to phase noise of the signal generator are differentiated. C3. The receiver of C1, wherein the receiver is configured so that phase noise of the first local oscillator signal attributable to phase noise of the signal generator and phase noise of the second local oscillator signal attributable to phase noise of the signal generator are linearly scaled relative to one another. C4. The receiver of C1, wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another. C5. The receiver of C1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. C6. The receiver of C1, wherein the performing processing includes using a solution to a system of equations to extract the desired signal in the presence of phase noise induced distortion, wherein the first local oscillator signal and the second local oscillator signal have different frequencies, and wherein the receiver is configured to control the first local oscillator signal and the second local oscillator signal so that the system of equations is solvable for extraction of the desired signal. C7. The receiver of C1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the receiver is configured for control of the first local oscillator signal and the second local oscillator signal so that the system of equations is solvable for extraction of the desired signal. C8. The receiver of C1, wherein the performing processing includes using a solution to a system of equations to extract the desired signal in the presence of phase noise induced distortion, wherein the receiver is configured to control the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. C9. The receiver of C1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein a vector subspace spanned by the desired signal in the system of equations is linearly independent of a vector subspace spanned by a distortion term in the system of equations so that the system of equations is solvable for extraction of the desired signal. C10. The receiver of C1, wherein the first downconverted signal is an intermediate frequency (IF) signal, and wherein the first observed signal is a baseband signal downconverted from the first downconverted signal. C11. The receiver of C1, wherein the first downconverted signal is a baseband signal that defines the first observed signal. C12. The receiver of C1, wherein the radiofrequency signal includes the desired signal and an interferer signal, wherein the receiver is configured, by extracting of the desired signal, to suppress reciprocal mixing phase noise distortion attributable to spreading of the spectrum of the interferer signal by phase noise from the signal generator.C13. The receiver of C1, including a third mixer disposed in a third signal path, wherein the third mixer performs mixing of the radiofrequency signal with a third local oscillator signal to provide a third downconverted signal, the third local oscillator signal produced using the signal generator; wherein receiver is configured for performing processing of the first observed signal from the first signal path, the second observed signal from the second signal path, and a third observed signal from the third signal path to extract the desired signal, wherein the third observed signal is produced in dependence on the mixing by the third mixer. C14. The receiver of C1, wherein the first downconverted signal is further downconverted to produce the first observed signal, and therein the second observed signal is defined by the second downconverted signal. C15. The receiver of C1, wherein the first observed signal is defined by the first downconverted signal and wherein the second observed signal is defined by the second downconverted signal. C16. The receiver of C1, wherein the receiver includes a frequency conditioning circuit for producing the first local oscillator signal and the second local oscillator signal, and wherein the frequency conditioning circuit is absent of active circuitry defining a source of noise additional to phase noise of the signal generator. C17. The receiver of C1, wherein the performing processing includes using a linear equalizer selected from the group consisting of a minimal mean square equalizer (MMSE) solver and a zero forcing (ZF) solver. C18. The receiver of C1, wherein the first local oscillator signal is a multiple tone local oscillator signal, and wherein the second local oscillator signal is a multiple tone local oscillator signal. C19. The receiver of C1, wherein the first local oscillator signal is a single tone local oscillator signal. C20. The receiver of C1, wherein receiver includes, for producing the first local oscillator signal a first frequency multiplier that multiplies a frequency of a generated signal generated by the signal generator, and wherein the receiver includes, for producing the second local oscillator signal a second frequency multiplier that multiplies the frequency of the generated signal generated by the signal generator, wherein the first frequency multiplier and the second frequency multiplier are scaled differently. C21. The receiver of C1, wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the receiver is configured for control of the first local oscillator signal and the second local oscillator signal so that the system of equations is solvable for extraction of the desired signal. C22. The receiver of C1, wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the receiver is configured for control of the first local oscillator signal and the second local oscillator signal so that the system of equations is solvable for extraction of the desired signal, wherein the receiver includes a frequency conditioning circuit for producing the first local oscillator signal and the second local oscillator signal, and wherein the frequency conditioning circuit is absent of active circuitry defining a source of noise additional to phase noise of the signal generator. C23. The receiver of C1, wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the receiver is configured for control of the first local oscillator signal and the second local oscillator signal so that the system of equations is solvable for extraction of the desired signal, wherein the receiver includes a frequency conditioning circuit for producing the first local oscillator signal and the second local oscillator signal, and wherein the frequency conditioning circuit is absent of active circuitry defining a source of noise additional to phase noise of the signal generator, wherein the radiofrequency signal includes the desired signal and an interferer signal, wherein the receiver is configured, by extracting of the desired signal, to suppress reciprocal mixing phase noise distortion attributable to spreading of the spectrum of the interferer signal by phase noise from the signal generator, wherein the receiver includes a third mixer disposed in a third signal path, wherein the third mixer performs mixing of the radiofrequency signal with a third local oscillator signal to provide a third downconverted signal, the third local oscillator signal produced using the signal generator; wherein receiver is configured for performing processing of the first observed signal from the first signal path, the second observed signal from the second signal path, and a third observed signal from the third signal path to extract the desired signal, wherein the third observed signal is produced in dependence on the mixing by the third mixer, wherein the performing processing includes using a linear equalizer selected from the group consisting of a minimal mean square equalizer (MMSE) solver and a zero forcing (ZF) solver.

A small sample of combinations set forth herein include the following.

D1. A method comprising: mixing a radiofrequency signal with a first local oscillator signal in a first signal path to provide a first downconverted signal, the first local oscillator signal produced using a signal generator, wherein the radiofrequency signal includes a desired signal; mixing the radiofrequency signal with a second local oscillator signal in a second signal path to provide a second downconverted signal, the second local oscillator signal produced using the signal generator; and performing processing of a first observed signal from the first signal path and a second observed signal from the second signal path to extract the desired signal, wherein the first observed signal is produced in dependence on the mixing of the radiofrequency signal with the first local oscillator signal and wherein the second observed signal is produced in dependence on the mixing of the radiofrequency signal with the second local oscillator signal. D2. The method of D1, wherein the method includes controlling phase noise of the first local oscillator signal attributable to phase noise of the signal generator and phase noise of the second local oscillator signal attributable to phase noise of the signal generator to be differentiated. D3. The method of D1, wherein the method includes controlling phase noise of the first local oscillator signal attributable to phase noise of the signal generator and phase noise of the second local oscillator signal attributable to phase noise of the signal generator to be linearly scaled relative to one another. D4. The method of D1, wherein the method includes controlling the first local oscillator signal and the second local oscillator signal so that the first local oscillator signal includes a first frequency, and the second local oscillator signal includes a second frequency, the second frequency different from the first frequency, wherein the method includes controlling phase noise of the first local oscillator signal attributable to phase noise of the signal generator and phase noise of the second local oscillator signal attributable to phase noise of the signal generator to be linearly scaled relative to one another. D5. The method of D1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. D6. The method of D1, wherein the performing processing includes using a solution to a system of equations to extract the desired signal in the presence of phase noise induced distortion, wherein the first local oscillator signal and the second local oscillator signal have different frequencies, and wherein the method includes controlling the first local oscillator signal and the second local oscillator signal so that the system of equations is solvable for extraction of the desired signal. D7. The method of D1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the method includes controlling the first local oscillator signal and the second local oscillator signal so that the system of equations is solvable for extraction of the desired signal. D8. The method of D1, wherein the performing processing includes using a solution to a system of equations to extract the desired signal in the presence of phase noise induced distortion, wherein method includes controlling the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. D9. The method of D1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein a vector subspace spanned by the desired signal in the system of equations is independent of a vector subspace spanned by a distortion term in the system of equations so that the system of equations is solvable for extraction of the desired signal. D10. The method of D1, wherein the first downconverted signal is an intermediate frequency (IF) signal, and wherein the first observed signal is a baseband signal downconverted from the first downconverted signal. D11. The method of D1, wherein the first downconverted signal is a baseband signal that defines the first observed signal. D12. The method of D1, wherein the radiofrequency signal includes the desired signal and an interferer signal, wherein the method includes extracting of the desired signal to suppress reciprocal mixing phase noise distortion attributable to spreading of the spectrum of the interferer signal by phase noise from the signal generator. D13. The method of D1, wherein the method includes mixing of the radiofrequency signal with a third local oscillator signal to provide a third downconverted signal, the third local oscillator signal produced using the signal generator; wherein the performing processing includes performing processing of the first observed signal from the first signal path, the second observed signal from the second signal path, and a third observed signal from the third signal path to extract the desired signal, wherein the third observed signal is produced in dependence on the mixing of the radiofrequency signal with the third local oscillator signal to provide the third downconverted signal. D14. The method of D1, wherein the first downconverted signal is further downconverted to produce the first observed signal, and therein the second observed signal is defined by the second downconverted signal. D15. The method of D1, wherein the first observed signal is defined by the first downconverted signal and wherein the second observed signal is defined by the second downconverted signal. D16. The method of D1, wherein the method includes using a frequency conditioning circuit for producing the first local oscillator signal and the second local oscillator signal, wherein the frequency conditioning circuit is absent of active circuitry defining a source of noise additional to phase noise of the signal generator. D17. The method of D1, wherein the performing processing includes using a linear equalizer selected from the group consisting of a minimal mean square equalizer (MMSE) solver and a zero forcing (ZF) solver. D18. The method of D1, wherein the first local oscillator signal is a multiple tone local oscillator signal, and wherein the second local oscillator signal is a multiple tone local oscillator signal. D19. The method of D1, wherein the first local oscillator signal is a single tone local oscillator signal. D20. The method of D1, wherein the performing processing includes using a solution to a system of equations to extract the desired signal in the presence of phase noise induced distortion, wherein the method includes controlling the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator. D21. The method of D1, wherein the method includes controlling the first and second local oscillator signals so that the first local oscillator signal includes a first frequency, and the second local oscillator signal includes a second frequency, the second frequency different from the first frequency, wherein the method includes controlling phase noise of the first local oscillator signal attributable to phase noise of the signal generator and phase noise of the second local oscillator signal attributable to phase noise of the signal generator to be linearly scaled relative to one another, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein method includes controlling the first local oscillator signal and the second local oscillator signal so that the system of equations is solvable for extraction of the desired signal, wherein the method includes using a frequency conditioning circuit for producing the first local oscillator signal and the second local oscillator signal, wherein the frequency conditioning circuit is absent of active circuitry defining a source of noise additional to phase noise of the signal generator, wherein the radiofrequency signal includes the desired signal and an interferer signal, wherein the method includes extracting of the desired signal to suppress reciprocal mixing phase noise distortion attributable to spreading of the spectrum of the interferer signal by phase noise from the signal generator, wherein the method includes mixing of the radiofrequency signal with a third local oscillator signal to provide a third downconverted signal, the third local oscillator signal produced using the signal generator; wherein the performing processing includes performing processing of the first observed signal from the first signal path, the second observed signal from the second signal path, and a third observed signal from the third signal path to extract the desired signal, wherein the third observed signal is produced in dependence on the mixing of the radiofrequency signal with the third local oscillator signal to provide the third downconverted signal, wherein the performing processing includes using a linear equalizer selected from the group consisting of a minimal mean square equalizer (MMSE) solver and a zero forcing (ZF) solver.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). The terms "about," "approximately" and "substantially," "relatively," or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to +10% as noted herein, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. If used herein, the terms "substantially," "approximately," "about," "relatively," or other such similar terms may also refer to no fluctuations, that is, +0%. It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It should be appreciated that all combinations of the foregoing concepts and additional concepts discussed in greater detail below (provided such concepts are not mutually inconsistent) are contemplated as being part of the subject matter disclosed herein at least to achieve the benefits as described herein. In particular, all combinations of claims subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely provided by way of example. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Forms of the term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph (35 U.S.C. § 112 (f)), unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements, it will be understood that the subject matter can be practiced with less than or greater than the certain number of elements. Accordingly, the subject matter is not to be seen as limited by the foregoing description, but is only limited by the scope of the appended claims.

The accompanying figures, in which like reference numerals refer to identical or functionally similar elements throughout the separate views and which are incorporated in and form a part of the specification, further illustrate the present implementation(s) and, together with the detailed description of the implementation(s), serve to explain the principles of the present implementation(s). As understood by one of skill in the art, the accompanying figures are provided for ease of understanding and illustrate aspects of certain examples of the present implementation(s). The implementation(s) is/are not limited to the examples depicted in the figures.

What is claimed is:

1. A receiver comprising:

a first mixer disposed in a first signal path, wherein the first mixer performs mixing of a radiofrequency signal with a first local oscillator signal to provide a first downconverted signal, the first local oscillator signal is produced using a signal generator, wherein the radiofrequency signal includes a desired signal;

a second mixer disposed in a second signal path, wherein the second mixer performs mixing of the radiofrequency signal with a second local oscillator signal to provide a second downconverted signal, the second local oscillator signal is produced using the signal generator;

wherein receiver is configured for performing processing of a first observed signal from the first signal path and a second observed signal from the second signal path to extract the desired signal, wherein the first observed signal is produced in dependence on the mixing by the first mixer and wherein the second observed signal is produced in dependence on the mixing by the second mixer, and wherein the receiver is configured so that phase noise of the first local oscillator signal attributable to phase noise of the signal generator and phase noise of the second local oscillator signal attributable to phase noise of the signal generator are differentiated.

2. The receiver of claim 1, wherein the receiver is configured so that phase noise of the first local oscillator signal attributable to phase noise of the signal generator and phase noise of the second local oscillator signal attributable to phase noise of the signal generator are linearly scaled relative to one another.

3. The receiver of claim 1, wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another.

4. The receiver of claim 1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator.

5. The receiver of claim 1, wherein the performing processing includes using a solution to a system of equations to extract the desired signal in the presence of phase noise induced distortion, wherein the first local oscillator signal and the second local oscillator signal have different frequencies, and wherein the receiver is configured to control the first local oscillator signal and the second local oscillator signal so that the system of equations is solvable for extraction of the desired signal.

6. The receiver of claim 1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the receiver is configured for control of the first local oscillator signal and the second local oscillator signal so that the system of equations is solvable for extraction of the desired signal.

7. The receiver of claim 1, wherein the performing processing includes using a solution to a system of equations to extract the desired signal in the presence of phase noise induced distortion, wherein the receiver is configured to control the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator.

8. The receiver of claim 1, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein a vector subspace spanned by the desired signal in the system of equations is linearly independent of a vector subspace spanned by a distortion term in the system of equations so that the system of equations is solvable for extraction of the desired signal.

9. The receiver of claim 1, wherein the first downconverted signal is an intermediate frequency (IF) signal, and wherein the first observed signal is a baseband signal downconverted from the first downconverted signal.

10. The receiver of claim 1, wherein the first downconverted signal is a baseband signal that defines the first observed signal.

11. The receiver of claim 1, wherein the radiofrequency signal includes the desired signal and an interferer signal, wherein the receiver is configured, by extracting of the desired signal, to suppress reciprocal mixing phase noise distortion attributable to spreading of the spectrum of the interferer signal by phase noise from the signal generator.

12. The receiver of claim 1, including a third mixer disposed in a third signal path, wherein the third mixer performs mixing of the radiofrequency signal with a third local oscillator signal to provide a third downconverted signal, the third local oscillator signal produced using the signal generator; wherein receiver is configured for performing processing of the first observed signal from the first signal path, the second observed signal from the second signal path, and a third observed signal from the third signal path to extract the desired signal, wherein the third observed signal is produced in dependence on the mixing by the third mixer.

13. The receiver of claim 1, wherein the first downconverted signal is further downconverted to produce the first observed signal, and therein the second observed signal is defined by the second downconverted signal.

14. The receiver of claim 1, wherein the first observed signal is defined by the first downconverted signal and wherein the second observed signal is defined by the second downconverted signal.

15. The receiver of claim 1, wherein the receiver includes a frequency conditioning circuit for producing the first local oscillator signal and the second local oscillator signal, and wherein the frequency conditioning circuit is absent of active circuitry defining a source of noise additional to phase noise of the signal generator.

16. The receiver of claim 1, wherein the performing processing includes using a linear equalizer selected from the group consisting of a minimal mean square equalizer (MMSE) solver and a zero forcing (ZF) solver.

17. The receiver of claim 1, wherein the first local oscillator signal is a multiple tone local oscillator signal, and wherein the second local oscillator signal is a multiple tone local oscillator signal.

18. The receiver of claim 1, wherein the first local oscillator signal is a single tone local oscillator signal.

19. The receiver of claim 1, wherein the receiver includes, for producing the first local oscillator signal a first frequency multiplier that multiplies a frequency of a generated signal generated by the signal generator, the first frequency multiplier producing the first local oscillator signal, and wherein the receiver includes a second frequency multiplier that multiplies the frequency of the generated signal generated by the signal generator, the second frequency multiplier producing the second local oscillator signal, wherein the first frequency multiplier and the second frequency multiplier are scaled differently.

20. The receiver of claim 1, wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the receiver is configured for control of the first local oscillator signal and the second local oscillator signal so that the system of equations is solvable for extraction of the desired signal.

21. The receiver of claim 1, wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the receiver is configured for control of the first local oscillator signal and the second local oscillator signal so that the system of equations is solvable for extraction of the desired signal, wherein the receiver includes a frequency conditioning circuit for producing the first local oscillator signal and the second local oscillator signal, and wherein the frequency conditioning circuit is absent of active circuitry defining a source of noise additional to phase noise of the signal generator.

22. The receiver of claim 1, wherein the receiver is configured so that the first local oscillator signal includes a first frequency, and wherein the second local oscillator signal includes a second frequency, the second frequency different from the first frequency, wherein the receiver is configured so that phase noise of the first local oscillator signal attributable to phase noise of the signal generator and phase noise of the second local oscillator signal attributable to phase noise of the signal generator are linearly scaled relative to one another, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the receiver is configured for control of the first local oscillator signal and the second local oscillator signal so that the system of equations is solvable for extraction of the desired signal, wherein the receiver includes a frequency conditioning circuit for producing the first local oscillator signal and the second local oscillator signal, and wherein the frequency conditioning circuit is absent of active circuitry defining a source of noise additional to phase noise of the signal generator, wherein the radiofrequency signal includes the desired signal and an interferer signal, wherein the receiver is configured, by extracting of the desired signal, to suppress reciprocal mixing phase noise distortion attributable to spreading of the spectrum of the interferer signal by phase noise from the signal generator, wherein the receiver includes a third mixer disposed in a third signal path, wherein the third mixer performs mixing of the radiofrequency signal with a third local oscillator signal to provide a third downconverted signal, the third local oscillator signal produced using the signal generator; wherein receiver is configured for performing processing of the first observed signal from the first signal path, the second observed signal from the second signal path, and a third observed signal from the third signal path to extract the desired signal, wherein the third observed signal is produced in dependence on the mixing by the third mixer, wherein the performing processing includes using a linear equalizer selected from the group consisting of a minimal mean square equalizer (MMSE) solver and a zero forcing (ZF) solver.

23. A method comprising:

mixing a radiofrequency signal with a first local oscillator signal in a first signal path to provide a first downconverted signal, the first local oscillator signal produced using a signal generator, wherein the radiofrequency signal includes a desired signal;

mixing the radiofrequency signal with a second local oscillator signal in a second signal path to provide a second downconverted signal, the second local oscillator signal produced using the signal generator;

controlling phase noise of the first local oscillator signal attributable to phase noise of the signal generator and phase noise of the second local oscillator signal attributable to phase noise of the signal generator to be differentiated; and performing processing of a first observed signal from the first signal path and a second observed signal from the second signal path to extract the desired signal, wherein the first observed signal is produced in dependence on the mixing of the radiofrequency signal with the first local oscillator signal and wherein the second observed signal is produced in dependence on the mixing of the radiofrequency signal with the second local oscillator signal.

24. The method of claim 23, wherein the method includes controlling phase noise of the first local oscillator signal attributable to phase noise of the signal generator and phase noise of the second local oscillator signal attributable to phase noise of the signal generator to be linearly scaled relative to one another.

25. The method of claim 23, wherein the method includes controlling the first local oscillator signal and the second local oscillator signal so that the first local oscillator signal includes a first frequency, and the second local oscillator signal includes a second frequency, the second frequency different from the first frequency, wherein the method includes controlling phase noise of the first local oscillator signal attributable to phase noise of the signal generator and phase noise of the second local oscillator signal attributable to phase noise of the signal generator to be linearly scaled relative to one another.

26. The method of claim 23, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator.

27. The method of claim 23, wherein the performing processing includes using a solution to a system of equations to extract the desired signal in the presence of phase noise induced distortion, wherein the first local oscillator signal and the second local oscillator signal have different frequencies, and wherein the method includes controlling the first local oscillator signal and the second local oscillator signal so that the system of equations is solvable for extraction of the desired signal.

28. The method of claim 23, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein the method includes controlling the first local oscillator signal and the second local oscillator signal so that the system of equations is solvable for extraction of the desired signal.

29. The method of claim 23, wherein the performing processing includes using a solution to a system of equations to extract the desired signal in the presence of phase noise induced distortion, wherein method includes controlling the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator.

30. The method of claim 23, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein a vector subspace spanned by the desired signal in the system of equations is independent of a vector subspace spanned by a distortion term in the system of equations so that the system of equations is solvable for extraction of the desired signal.

31. The method of claim 23, wherein the first downconverted signal is an intermediate frequency (IF) signal, and wherein the first observed signal is a baseband signal downconverted from the first downconverted signal.

32. The method of claim 23, wherein the first downconverted signal is a baseband signal that defines the first observed signal.

33. The method of claim 23, wherein the radiofrequency signal includes the desired signal and an interferer signal, wherein the method includes extracting of the desired signal to suppress reciprocal mixing phase noise distortion attributable to spreading of the spectrum of the interferer signal by phase noise from the signal generator.

34. The method of claim 23, wherein the method includes mixing of the radiofrequency signal with a third local oscillator signal to provide a third downconverted signal, the third local oscillator signal produced using the signal generator; wherein the performing processing includes performing processing of the first observed signal from the first signal path, the second observed signal from the second signal path, and a third observed signal from the third signal path to extract the desired signal, wherein the third observed signal is produced in dependence on the mixing of the radiofrequency signal with the third local oscillator signal to provide the third downconverted signal.

35. The method of claim 23, wherein the first downconverted signal is further downconverted to produce the first observed signal, and therein the second observed signal is defined by the second downconverted signal.

36. The method of claim 23, wherein the first observed signal is defined by the first downconverted signal and wherein the second observed signal is defined by the second downconverted signal.

37. The method of claim 23, wherein the method includes using a frequency conditioning circuit for producing the first local oscillator signal and the second local oscillator signal, wherein the frequency conditioning circuit is absent of active circuitry defining a source of noise additional to phase noise of the signal generator.

38. The method of claim 23, wherein the performing processing includes using a linear equalizer selected from the group consisting of a minimal mean square equalizer (MMSE) solver and a zero forcing (ZF) solver.

39. The method of claim 23, wherein the first local oscillator signal is a multiple tone local oscillator signal, and wherein the second local oscillator signal is a multiple tone local oscillator signal.

40. The method of claim 23, wherein the first local oscillator signal is a single tone local oscillator signal.

41. The method of claim 23, wherein the performing processing includes using a solution to a system of equations to extract the desired signal in the presence of phase noise induced distortion, wherein the method includes controlling the first local oscillator signal and the second local oscillator signal so that the system of equations is solvable for extraction of the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator.

42. The method of claim 23, wherein the method includes controlling the first and second local oscillator signals so that the first local oscillator signal includes a first frequency, and the second local oscillator signal includes a second frequency, the second frequency different from the first frequency, wherein the method includes controlling phase noise of the first local oscillator signal attributable to phase noise of the signal generator and phase noise of the second local oscillator signal attributable to phase noise of the signal generator to be linearly scaled relative to one another, wherein the performing processing includes using a solution to a system of equations to extract the desired signal, wherein a first equation of the system of equations expresses the first observed signal as a function the desired signal and phase noise distortion of the radiofrequency signal attributable to a phase noise of the signal generator, and wherein a second equation of the system of equations expresses the second observed signal as a function the desired signal and phase noise distortion of the radiofrequency signal attributable to the phase noise of the signal generator, wherein method includes controlling the first local oscillator signal and the second local oscillator signal so that the system of equations is solvable for extraction of the desired signal, wherein the method includes using a frequency conditioning circuit for producing the first local oscillator signal and the second local oscillator signal, wherein the frequency conditioning circuit is absent of active circuitry defining a source of noise additional to phase noise of the signal generator, wherein the radiofrequency signal includes the desired signal and an interferer signal, wherein the method includes extracting of the desired signal to suppress reciprocal mixing phase noise distortion attributable to spreading of the spectrum of the interferer signal by phase noise from the signal generator, wherein the method includes mixing of the radiofrequency signal with a third local oscillator signal to provide a third downconverted signal, the third local oscillator signal produced using the signal generator; wherein the performing processing includes performing processing of the first observed signal from the first signal path, the second observed signal from the second signal path, and a third observed signal from the third signal path to extract the desired signal, wherein the third observed signal is produced in dependence on the mixing of the radiofrequency signal with the third local oscillator signal to provide the third downconverted signal, wherein the performing processing includes using a linear equalizer selected from the group consisting of a minimal mean square equalizer (MMSE) solver and a zero forcing (ZF) solver.

43. A receiver comprising:

a first mixer disposed in a first signal path, wherein the first mixer performs mixing of a radiofrequency signal with a first local oscillator signal to provide a first downconverted signal, the first local oscillator signal is produced using a signal generator, wherein the radiofrequency signal includes a desired signal;

a second mixer disposed in a second signal path, wherein the second mixer performs mixing of the radiofrequency signal with a second local oscillator signal to provide a second downconverted signal, the second local oscillator signal is produced using the signal generator;

wherein receiver is configured for performing processing of a first observed signal from the first signal path and a second observed signal from the second signal path to extract the desired signal, wherein the first observed signal is produced in dependence on the mixing by the first mixer and wherein the second observed signal is produced in dependence on the mixing by the second mixer, and wherein the receiver is configured so that phase noise of the first local oscillator signal attributable to phase noise of the signal generator and phase noise of the second local oscillator signal attributable to phase noise of the signal generator are linearly scaled relative to one another.

44. A receiver comprising:

a first mixer disposed in a first signal path, wherein the first mixer performs mixing of a radiofrequency signal with a first local oscillator signal to provide a first downconverted signal, the first local oscillator signal is produced using a signal generator, wherein the radiofrequency signal includes a desired signal;

a second mixer disposed in a second signal path, wherein the second mixer performs mixing of the radiofrequency signal with a second local oscillator signal to provide a second downconverted signal, the second local oscillator signal is produced using the signal generator;

wherein receiver is configured for performing processing of a first observed signal from the first signal path and a second observed signal from the second signal path to extract the desired signal, wherein the first observed signal is produced in dependence on the mixing by the first mixer and wherein the second observed signal is produced in dependence on the mixing by the second mixer, and wherein the radiofrequency signal includes the desired signal and an interferer signal, wherein the receiver is configured, by extracting of the desired signal, to suppress reciprocal mixing phase noise distortion attributable to spreading of the spectrum of the interferer signal by phase noise from the signal generator.

* * * * *